United States Patent
Micklash, II et al.

(10) Patent No.: US 6,682,703 B2
(45) Date of Patent: Jan. 27, 2004

(54) PARALLEL REACTION DEVICES

(75) Inventors: Kenneth J. Micklash, II, San Diego, CA (US); Kristina Burow, Cardiff-by-the-Sea, CA (US); Brad Backes, Cardiff-by-the-Sea, CA (US)

(73) Assignee: IRM, LLC, Hamilton (BM)

( * ) Notice: Subject to any disclaimer, the term of this patent is extended or adjusted under 35 U.S.C. 154(b) by 0 days.

(21) Appl. No.: 09/947,236

(22) Filed: Sep. 5, 2001

(65) Prior Publication Data

US 2003/0044324 A1 Mar. 6, 2003

(51) Int. Cl.$^7$ .................................................. B01L 3/00
(52) U.S. Cl. ........................ 422/102; 422/99; 422/104; 422/129; 422/130; 422/131; 435/288.4; 435/305.2; 435/305.3; 435/305.4
(58) Field of Search ................................. 422/102, 104, 422/129–131, 99, 100, 101, 103; 435/288.4, 305.2, 305.3, 305.4

(56) References Cited

U.S. PATENT DOCUMENTS

| | | | | |
|---|---|---|---|---|
| 4,685,710 A | * | 8/1987 | Ghaly | 292/67 |
| 4,790,146 A | * | 12/1988 | Mun et al. | 62/441 |
| 5,056,427 A | * | 10/1991 | Sakabe et al. | 100/211 |
| 5,057,282 A | * | 10/1991 | Linder | 422/104 |
| 5,205,015 A | * | 4/1993 | Huang | 16/50 |
| 5,282,543 A | * | 2/1994 | Picozza et al. | 220/255 |
| 5,582,801 A | | 12/1996 | DeWitt et al. | |
| 5,846,493 A | | 12/1998 | Bankier et al. | |
| 6,054,100 A | * | 4/2000 | Stanchfield et al. | 422/102 |
| 6,106,783 A | * | 8/2000 | Gamble | 422/102 |
| 6,136,273 A | * | 10/2000 | Seguin et al. | 422/99 |
| 6,159,368 A | * | 12/2000 | Moring et al. | 210/321.75 |
| 6,202,878 B1 | * | 3/2001 | Cook | 220/255 |
| 6,328,933 B1 | * | 12/2001 | Labriola et al. | 422/104 |
| 6,379,626 B1 | * | 4/2002 | Munson et al. | 422/102 |
| 6,447,726 B1 | * | 9/2002 | Delucas et al. | 422/99 |
| 6,455,005 B1 | * | 9/2002 | Berray et al. | 422/99 |

FOREIGN PATENT DOCUMENTS

| | | | |
|---|---|---|---|
| EP | 0 388 159 A2 | * | 9/1990 |
| JP | 06033654 A | * | 2/1994 |
| WO | WO 96/09550 | * | 3/1996 |

OTHER PUBLICATIONS

Castelino et al., 2000 Automated sample storage for drug discovery, *Chim. Oggi* 17:32–35.

* cited by examiner

*Primary Examiner*—Jill Warden
*Assistant Examiner*—Elizabeth Quan
(74) *Attorney, Agent, or Firm*—Timothy L. Smith; Christopher C. Sappenfield; Quine Intellectual Property Law Group, P.C.

(57) ABSTRACT

The present invention relates to parallel reaction devices that include reaction blocks having arrays of reaction wells. Devices of the invention also typically include lids having arrays of protrusions disposed thereon, which protrusions axially align with the reaction wells, and/or attachment components that include hinges that permit lids to be removed from reaction blocks.

38 Claims, 17 Drawing Sheets

PARALLEL REACTION DEVICES

COPYRIGHT NOTIFICATION

Pursuant to 37 C.F.R. §1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

CROSS-REFERENCES TO RELATED APPLICATIONS

Not Applicable.

STATEMENT AS TO RIGHTS TO INVENTIONS MADE UNDER FEDERALLY SPONSORED RESEARCH AND DEVELOPMENT

Not Applicable.

BACKGROUND OF THE INVENTION

Modern techniques for identifying compounds with desired chemical or physical properties typically involve assembling complex libraries of compounds that are systematically screened to isolate members having the desired properties. One general approach to library construction involves creating compounds using combinatorial, parallel, or other synthetic processes in which sets of compounds are prepared from sets of building blocks, e.g., via multi-step solution- or solid-phase synthesis. For example, split/pool combinatorial synthetic techniques can be used to produce all possible combinations of a set of building blocks. In particular, the methods typically include splitting an initial pool of solid supports with attached chemical moieties into a selected number of individual pools. Each pool is subjected to a first randomization reaction that generates a different modification to the solid supports in each separate pool. Following this first set of reactions, the individual pools of solid supports are typically combined, mixed, and split once again into separate pools. Each split pool is then subjected to a second randomization, which again is different for each pool. This process is repeated until the desired library of target compounds is produced. Additional details relating to library synthesis using combinatorial and parallel approaches are described in, e.g., Houghten (2000) "Parallel array and mixture-based synthetic combinatorial chemistry: Tools for the next millennium," *Annu. Rev. Pharmacol. Toxicol.* 40:273–282, Thompson (2000) "Recent applications of polymer-supported reagents and scavengers in combinatorial, parallel, or multistep synthesis," *Curr. Opin. Chem. Biol.* 4:324–337, Bunin et al. (1999) "Application of combinatorial and parallel synthesis to medicinal chemistry," *Annu. Rep. Med. Chem.* 34:267–286, and Brooking et al. (1999) "Split-split. A multiple synthesiser approach to efficient automated parallel synthesis, *Tetrahedron Lett.* 40(7):1405–1408.

A standard tool for parallel chemistry, including randomization steps in combinatorial protocols, such as split/pool synthesis, is the multiple well reaction vessel that typically includes a collection of tubes or a reaction block bored out with a designated number of reaction wells or holes. These reaction wells are generally fitted with a filter at one end, which allows the individual wells to be employed for solid-liquid separations or other purification processes. The footprint of such reaction blocks typically corresponds to an array of wells in a standard micro-well assay plate. A series of individually addressable open reactors is generally formed within a reaction block by contacting a gasket to the bottom or outlets of the reaction wells. In addition, a series of enclosed reactors is typically made by sealing the top or inlets to the reaction wells with another gasket. Sealed reaction wells provide for aggressive agitation of well contents and for the use of extreme reaction conditions.

Sub-optimal sealing and clamping mechanisms inhibit throughput in multiple well reaction vessels of the prior art. Specifically, preexisting technologies typically require users to operate a series of latches, screws, and/or other fasteners, which hinders safe and efficient access to reaction chambers. Further, the clamping mechanisms of these devices generally do not provide secure reaction well seals such that leakage of materials from the reaction wells commonly results. Sample leakage typically causes reaction failure for the reaction within the particular well from which the leakage occurred and/or cross-contamination among multiple reaction wells. One source of leakage in preexisting devices is uneven clamp load over the reaction wells. In addition, the inferior designs that characterize the prior art also suffer from general losses of clamp load over time, which further contributes to the aforementioned leakage-related problems.

From the above, it is apparent that there is a substantial need for new parallel reaction devices that permit efficient and rapid access to reaction wells. It would also be desirable to have reaction blocks that remain securely sealed under diverse reaction conditions, including varied extremes of temperature and agitation. These and a variety of additional features of the present invention will become evident upon complete review of the following.

SUMMARY OF THE INVENTION

The present invention relates to devices for performing multiple reactions, such as combinatorial synthesis reactions, or other processes in parallel. More specifically, the invention provides parallel reaction devices that include secure and efficient sealing or clamping mechanisms, which significantly improve throughput relative to existing devices. The devices of the invention incorporate reaction blocks that include arrays of reaction wells. Reaction blocks are sometimes disposable or at least not intended for indefinite use. In addition to reaction blocks, the devices of the present invention include lids and gaskets for sealing reaction wells within the reaction blocks and attachment components for attaching the lids to the reaction blocks. In preferred embodiments, lids include arrays of protrusions that axially align with reaction wells in assembled devices to further enhance reaction well seals. The lids of the devices of the invention are also typically removably attached to reaction blocks and produce substantially even clamp loads across inlet or outlet portions of reaction blocks. Reaction block containers, systems, and kits that include these devices or device components are additionally provided.

In one aspect, the invention provides a parallel reaction device that includes (a) a reaction block that includes an array of reaction wells in which at least one reaction well in the array is disposed through the reaction block, which reaction well includes an inlet portion and an outlet portion, (b) a top lid attached to the reaction block by at least one top attachment component, which top lid includes at least one protrusion disposed on a surface that engages the reaction block, which protrusion presses a top gasket into contact with the inlet portion of the reaction well to seal the inlet portion, and (c) a bottom lid attached to the reaction block by at least one bottom attachment component, which bottom lid presses a bottom gasket into contact with the outlet portion of the reaction well to seal the outlet portion.

In another aspect, the invention relates to a parallel reaction device that includes (a) a reaction block that includes an array of reaction wells, wherein at least one reaction well in the array is disposed through the reaction block, which reaction well includes an inlet portion and an outlet portion, (b) a top lid attached to the reaction block by at least one top hinge component and at least one top latch component, which top lid presses a top gasket into contact with the inlet portion to the reaction well to seal the inlet portion, and (c) a bottom lid attached to the reaction block by at least one bottom hinge component and at least one bottom latch component, which bottom lid presses a bottom gasket into contact with the outlet portion of the reaction well to seal the outlet portion.

In yet another aspect, the invention provides a parallel reaction device that includes (a) a reaction block that includes an array of reaction wells in which at least one reaction well in the array is disposed through the reaction block, which reaction well includes an inlet portion and an outlet portion, (b) a top lid attached to the reaction block by at least one top hinge component and at least one top latch component, which top lid includes at least one protrusion disposed on a surface that engages the reaction block, which protrusion presses a top gasket into contact with the inlet portion to the reaction well to seal the inlet portion, and (c) a bottom lid attached to the reaction block by at least one bottom hinge component and at least one bottom latch component, which bottom lid presses a bottom gasket into contact with the outlet portion of the reaction well to seal the outlet portion.

The reaction blocks of the present invention include various embodiments. For example, reaction blocks optionally include cavities disposed between and proximal to inlet portions of adjacent reaction wells to direct fluidic materials away from other inlet portions. In certain preferred embodiments, each reaction well is disposed through the reaction block. In other preferred embodiments, one or more reaction wells further include a filter disposed therein. Optionally, at least two regions of the reaction well include different inner or outer cross-sectional dimensions. Further, outlet portions of the array of reaction wells typically include a footprint that corresponds to wells of a micro-well plate. In addition, the outlet portion generally includes an outlet spout having a smaller inner cross-sectional dimension than other regions of the reaction well in which a transition area between the outlet spout and the other regions in the reaction well is, e.g., abrupt, tapered, stepped, or the like.

In preferred embodiments, reaction blocks include at least one pair of substantially opposing recessed regions disposed in opposing surfaces of the reaction block proximal to a midpoint of each surface, which opposing recessed regions mount the top and bottom attachment components. In these embodiments, the top and bottom attachment components typically include (i) a band disposed around the reaction block in the opposing recessed regions in which the band includes at least one first top hinge component, at least one first top latch component, at least one first bottom hinge component, and at least one first bottom latch component, (ii) at least one second top hinge component and at least one second top latch component attached to the top lid in which the second top hinge component(s) removably engage(s) the first top hinge component(s) and the second top latch component(s) removably engage(s) the first top latch component(s), and (iii) at least one second bottom hinge component and at least one second bottom latch component (s) attached to the bottom lid in which the second bottom hinge component(s) removably engage(s) the first bottom hinge component(s) and the second bottom latch component (s) removably engage(s) the first bottom latch component(s). Each hinge component optionally independently includes, e.g., a male or a female lift-off hinge component, whereas each latch component optionally independently includes, e.g., a latch body (e.g., a rotatable draw latch body or the like) or a keeper plate.

The present invention also relates to a lid that includes at least one protrusion capable of pressing a gasket into contact with at least a portion of at least one reaction well of a reaction block that includes an array of reaction wells to seal (e.g., radially seal or the like) the reaction well when the lid is attached to the reaction block. In particular, the protrusion prevents leakage of fluidic materials from the inlet portion to reduce cross-contamination among the reaction wells. The lid typically includes an array of protrusions corresponding to the array of reaction wells. Optionally, the lid further includes an array of apertures disposed through the lid in which at least one aperture (e.g., a tapered aperture, etc.) axially aligns with the reaction well. For example, each member of the array of apertures generally axially aligns with a different reaction well. Fluidic materials are optionally introduced into reaction wells through apertures and gaskets through a needle (e.g., a syringe needle or the like). Further, the protrusion optionally includes a protruding annular ridge disposed around the aperture. The lid also typically further includes at least one attachment component (e.g., at least one latch and at least one hinge, or the like) to attach the lid to the reaction block.

The invention additionally relates to a lid that includes at least one latch component and at least one hinge component, which hinge component is capable of engaging at least one other hinge component and which latch component is capable of removably engaging at least one other latch component, which other hinge and other latch components are attached to a reaction block. Optionally, the lid further includes at least one protrusion disposed on a surface of the lid, which protrusion presses a gasket into contact with at least a portion of at least one reaction well of the reaction block. For example, the lid optionally includes an array of protrusions corresponding to an array of reaction wells disposed in the reaction block. In another embodiment, the lid further includes an array of apertures disposed through the lid in which at least one aperture (e.g., a tapered aperture, etc.) axially aligns with the reaction well. Typically, each member of the array of apertures axially aligns with a different reaction well.

The top and bottom gaskets typically include sheets of gasketing material. The top gasket optionally includes at least one protrusion, which protrusion axially aligns with the inlet portion. As an additional option, the bottom gasket includes at least one protrusion, which protrusion axially aligns with the outlet portion. For example, at least one of the top and bottom gaskets optionally includes an array of protrusions in which at least one protrusion axially aligns with the reaction well.

DETAILED DISCUSSION OF THE INVENTION

I. Definitions

Figure 1:
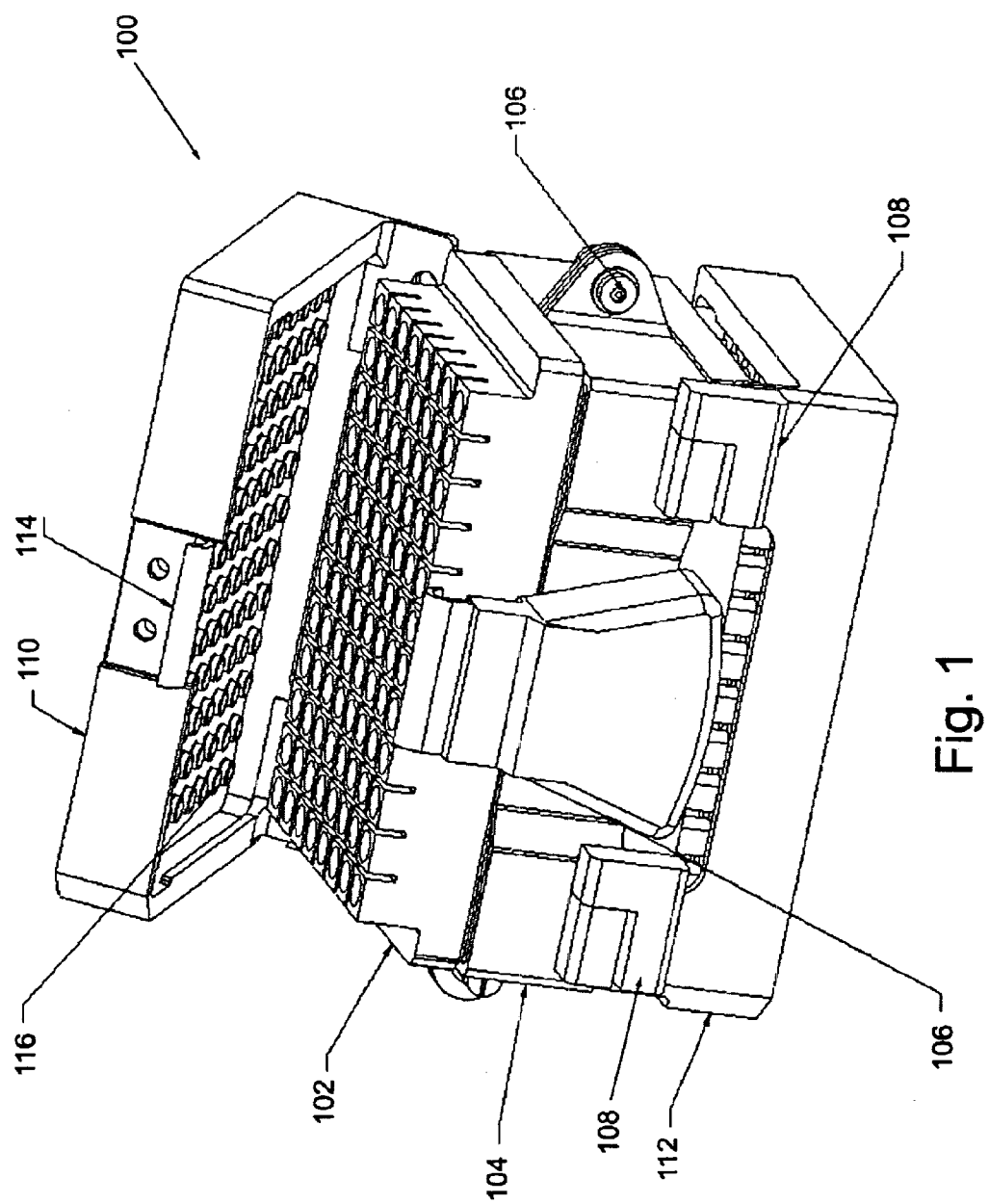
FIG. 1 schematically illustrates a front perspective view of a preferred embodiment of the parallel reaction device of the present invention.

Before describing the present invention in detail, it is to be understood that this invention is not limited to particular devices or systems, which can, of course, vary. It is also to be understood that the terminology used herein is for the purpose of describing particular embodiments only, and is not intended to be limiting. Further, unless defined otherwise, all technical and scientific terms used herein have the same meaning as commonly understood by one of ordinary skill in the art to which the invention pertains. In describing and claiming the present invention, the following terminology will be used in accordance with the definitions set out below.

An "array" refers to an ordered, regular, or spatially defined pattern, grouping, or arrangement of components. For example, an array of reaction wells in a reaction block includes a spatially defined pattern of reaction wells of essentially any number (e.g., 2, 4, 6, 12, 24, 48, 96, 384, 1536, or more reaction wells). For a given number reaction wells or other device components (e.g., apertures, protrusions, or the like), alternative spatial patterns are typically possible. To illustrate, a 48-well reaction block optionally includes an array of 4 rows by 12 columns of wells (i.e., a 4×12 array), a 6×8 array, or the like. In preferred embodiments, arrays of, e.g., reaction wells, apertures, protrusions, or the like have footprints that correspond to arrays of wells in commercially available micro-well plates or other sample containers (e.g., 6 wells in a 3×2 array, 12 wells in 3×4 array, 24 wells in a 6×4 array, 48 wells in a 6×8 array, 96 wells in a 8×12 array, or the like).

A "footprint" refers to the area on a surface covered by or corresponding to a device component or portions thereof. For example, outlet portions or spouts of a reaction block of the invention typically correspond to (e.g., fit into, match, align with, etc.) wells in a selected micro-well plate or other sample container. In preferred embodiments of the invention, device components (e.g., reaction wells, apertures, protrusions, etc.) and wells of micro-well plates have substantially the same footprint, such that they axially align with one another (e.g., for fluid communication with respect to reaction wells and apertures or wells of micro-well plates).

The term "top" refers to the highest point, level, surface, or part of a device, or device component, when oriented for typical designed or intended operational use, such as dispensing a fluidic material into a reaction well. For example, the parallel reaction devices of the invention generally include a top lid, top attachment components (e.g., top hinge and/or latch components, etc.), or the like. In contrast, the term "bottom" refers to the lowest point, level, surface, or part of a device, or device component, when oriented for typical designed or intended operational use. To illustrate, the devices of the invention typically include a bottom lid, bottom attachment components (e.g., bottom hinge and/or bottom components, etc.), or the like.

The phrase "substantially even clamp load or force" refers to an applied force that is approximately uniformly distributed across a contact surface towards which the force is directed. For example, when reaction wells are sealed in a device of the present invention, the force applied by a surface of a lid that engages a reaction block (e.g., through a sheet of gasketing material, etc.) is substantially the same at, e.g., any two points of contact with the reaction block (e.g., at any two inlet portions, at any two outlet portions, or the like).

The term "engages" refers to the bringing or coming together, interlocking, or meshing of device components. To illustrate, when a lid is attached to a reaction block to seal, e.g., inlet or outlet portions of the reaction block, the lid (e.g., a surface of the lid, etc.) is brought together with the reaction block, e.g., with a sheet of gasketing material disposed therebetween. Attachment components also engage one another, e.g., when male and female hinge components interlock or mesh with one another in operable alignment, when latch bodies and keeper plates interlock, or the like.

The phrase "radial seal" refers to the closure of a reaction well that is substantially uniform around a central axis, which seal secures the well against leakage.

II. Overview of Preferred Embodiments

The present invention relates to devices in which a diverse range of chemical, biological, filtration/separation, and/or other processes are optionally simultaneously performed with significantly improved throughput relative to other devices. In particular, the invention provides parallel reaction devices that permit users to rapidly and easily seal or unseal multiple reaction wells of the devices. In contrast, preexisting technologies require users to contend with a series of latches, screws, and/or other fasteners, which inhibits safe and efficient access to reaction wells. The reaction wells of the devices of the present invention also remain securely sealed under varied operational conditions, including thermal elevation, rotation/centrifugation, agitation, or the like. Many preexisting designs suffer from problems associated with leakage of reaction well contents due, e.g., to uneven clamp load over the reaction wells. Unlike the devices of the invention, the inferior designs that characterize the prior art are additionally plagued by general loss of clamp load over time. In addition, the vastly improved parallel reaction devices of the present invention are economical to manufacture. These and other superior features of the devices of the invention will become apparent upon complete review of the following detailed description.

FIG. 1 schematically illustrates a front perspective view of a parallel reaction device according to a preferred embodiment of the invention. As shown, device 100 includes reaction block 102, which contains multiple reaction wells. Reaction block 102 is designed so that band 104 can be placed around reaction block 102 and easily locked in place by, e.g., captured fasteners or latch bodies 106. Band 104 typically includes two latch bodies 106 (one is not within view) and four lift-off hinges 108 (two are not within view) attached for both top lid 110 and bottom lid 112. When sealing reaction block 102, mating portions of lift-off hinges 108, which are attached to top and bottom lids (110 and 112), are slid into or onto corresponding mating portions of lift-off hinges 108, which are attached to band 104. Top and bottom lids (110 and 112) are then closed and hooked portions of latch bodies 106 are placed over corresponding keeper plates or clasps 114, which are attached to top and bottom lids (110 and 112). Latch bodies 106 are turned to pull top and bottom lids (110 and 112) tightly closed, which compresses gaskets (not shown) between reaction block 102 and top and bottom lids (110 and 112), respectively. The compressed gaskets securely seal reaction wells in reaction block 102.

Top lid 110 is generally fabricated with small raised features or protrusions 116 (shown as annular ridges) corresponding to each well. In certain embodiments, bottom lid 112 also includes these features. Protrusions 116 push the gasket partially into each well to create radial seals. This type of seal is generally more robust than simple facial seals, which are produced in the absence of protrusions 116. Since band 104 is held in place by reaction block 102, top and bottom lids (110 and 112) can be opened independently of one another. As described herein, the features or components of parallel reaction device 100 are optionally customized to provide for general utility. For example, different footprints of reaction block 102 are optionally utilized for specialized equipment, e.g., different micro-well plates or the like.

Further, a variety of well formats and numbers are optionally provided, e.g., to increase the volume or numbers of individual wells. In addition, many different gasketing materials are optionally included to efficiently seal the wells depending on, e.g., the contents of the wells and reaction conditions.

Figure 2:
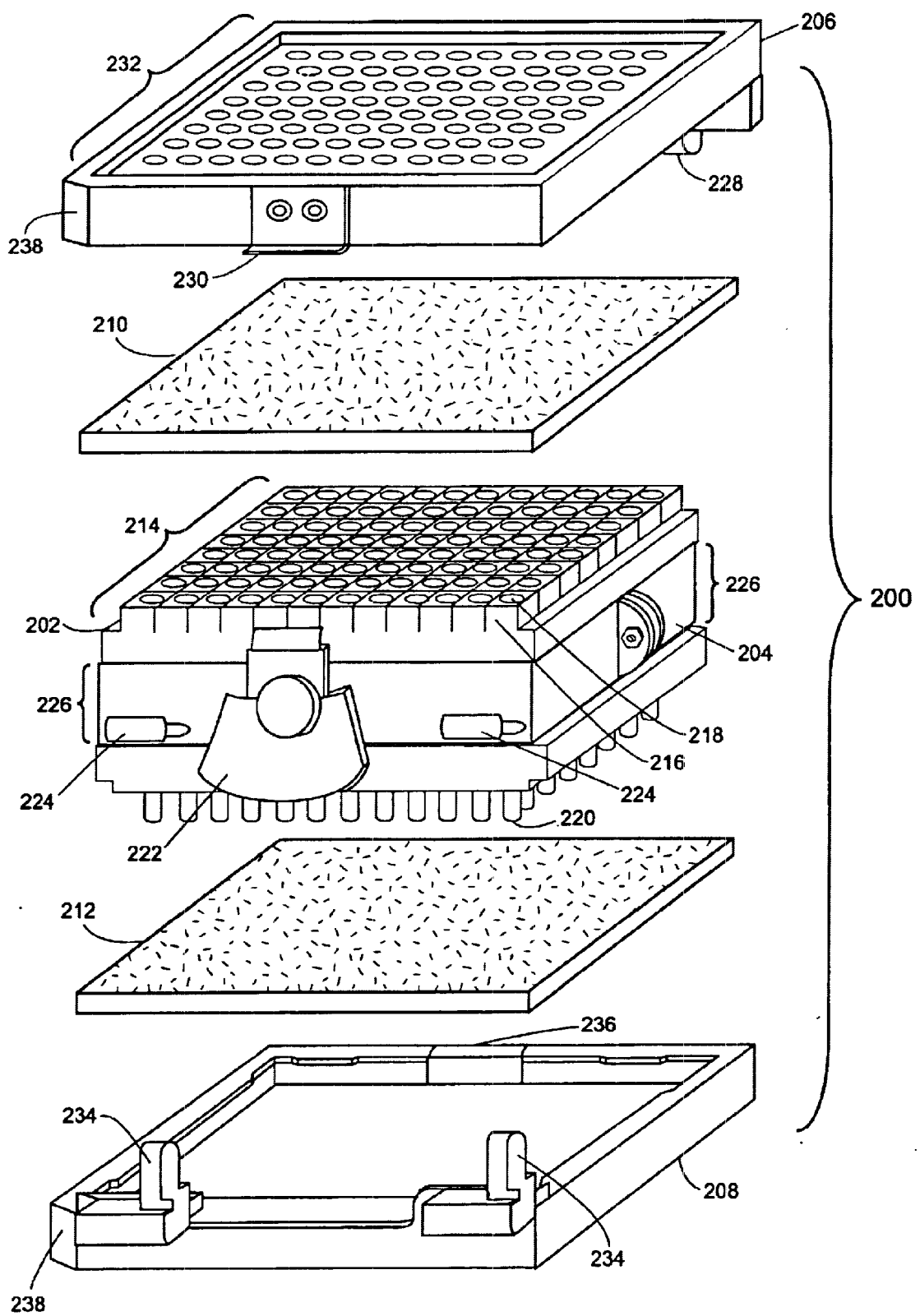
FIG. 2 schematically shows an exploded perspective view of a preferred embodiment of the parallel reaction device of the present invention.

FIG. 2 schematically shows an exploded perspective view of a preferred embodiment of a device of the present invention. As shown, parallel reaction device 200 includes reaction block 202, band 204, top lid 206, bottom lid 208, top gasket sheet 210, and bottom gasket sheet 212. Reaction block 202 includes array of reaction wells 214 in which individual reaction well 216 includes inlet portion 218 and outlet portion 220. Band 204 includes first top hinge components (not within view), first top latch component 222, first bottom hinge components 224, and first bottom latch component (not within view). As shown, band 204 is mounted in opposing recessed regions 226 of reaction block 202. Top lid 206 includes second top hinge components 228 (one not within view) and second top latch component 230 (shown as a keeper plate). As also shown, top lid 206 includes array of apertures 232, which axially align with members of array of reaction wells 214 in reaction block 202. Although not viewable in FIG. 2, top lid 206 also typically includes an array of protrusions (e.g., an array of annular ridges disposed around members of array of apertures 232) disposed on a surface of top lid 206 that engages reaction block 202 (e.g., a surface that forces top gasket sheet 210 into contact with reaction block 202 in an assembled device). Bottom lid 208 includes second bottom hinge components 234 and second bottom latch component 236. Top and bottom lids (206 and 208, respectively) can also include alignment structures 238, e.g., for aligning parallel reaction device 200 relative to a corresponding alignment structure on a controller apparatus, such as an X-Y-Z translational device. All device elements introduced above are described in greater detail below.

Figure 3A:
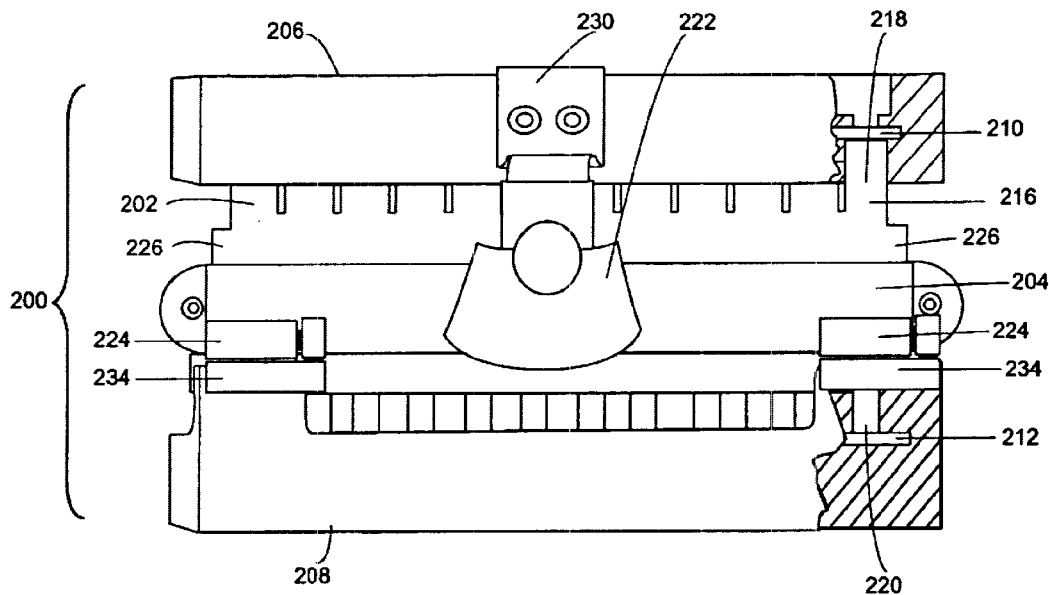
FIG. 3A schematically depicts the assembled reaction device of FIG. 2 from a cutaway, front elevational view.
Figure 3B:
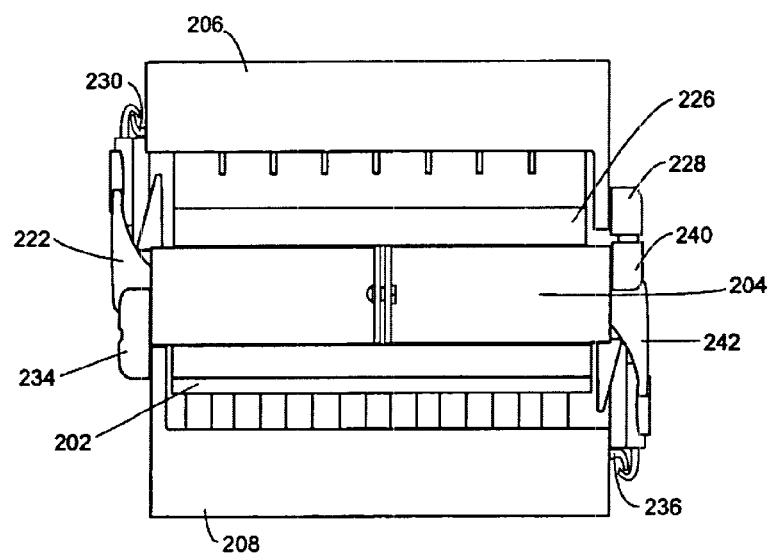
FIG. 3B schematically illustrates the assembled reaction device of FIG. 2 from a side elevational view.
Figure 3C:
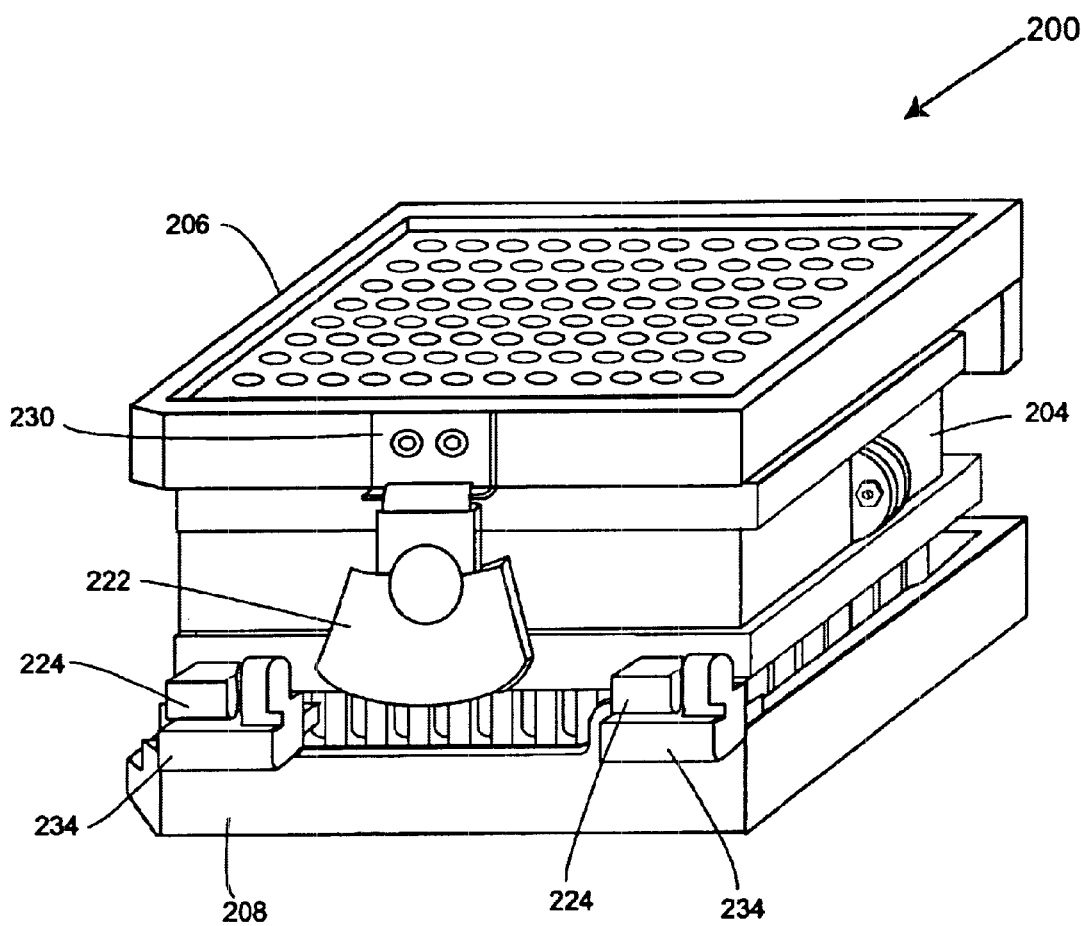
FIG. 3C schematically shows the assembled reaction device of FIG. 2 from a perspective view.

FIGS. 3A and B schematically depict the assembled reaction device of FIG. 2 from a cutaway, front elevational view and a side elevational view, respectively. As shown, first top latch component 222 of band 204 engages second top latch component 230 of top lid 206. Band 204 is seated or mounted in recessed regions 226 of reaction block 202. Top gasket sheet 210 is disposed between top lid 206 and reaction block 202 to seal, e.g., inlet portion 218 of reaction well 216 in parallel reaction device 200. As also shown, first bottom hinge components 224 of band 204 engage second bottom hinge components 234 of bottom lid 208. Bottom gasket sheet 212 is disposed between bottom lid 208 and reaction block 202 to seal, e.g., outlet portion 220 of reaction well 216. As additionally schematically depicted in FIG. 3B, second top hinge components 228 (one not within view) of top lid 206 engage first top hinge components 240 (one not within view) of band 204. First bottom latch component 242 of band 204 engages second bottom latch component 236 of bottom lid 208. FIG. 2C schematically shows the assembled reaction device of FIG. 2 from a perspective view.

III. Reaction Blocks

The reaction blocks of the present invention generally include arrays of reaction wells in which at least one reaction well in a given array is disposed (e.g., vertically disposed) through the particular reaction block. While in preferred embodiments all reaction wells are disposed completely through a reaction block, in other embodiments, fewer than all wells in an array are disposed completely through a reaction block. Further, reaction blocks are sometimes disposable components of the parallel reaction devices, whereas lids, attachment components, and bands are typically intended to be used indefinitely. The reaction blocks of the invention also include many alternative arrays of reaction wells and are fabricated from assorted materials or combinations of materials.

Figure 4A:
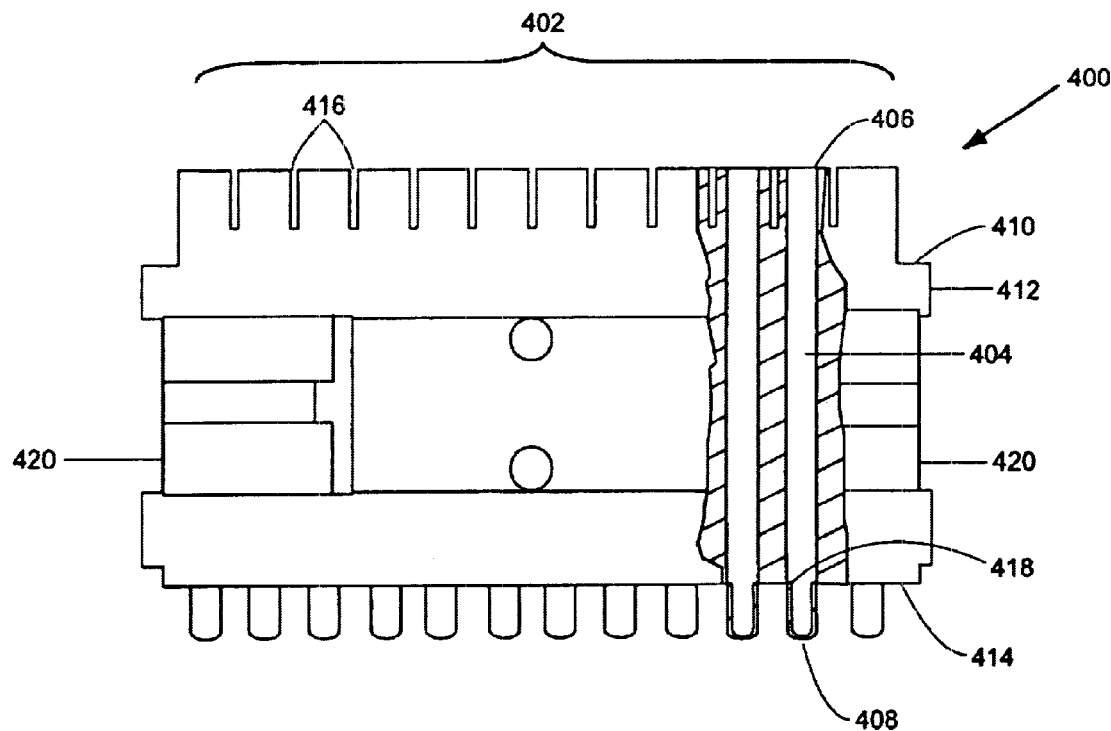
FIG. 4A schematically depicts a partially cutaway, front elevational view of a reaction block according to one embodiment of the invention.

FIG. 4A schematically illustrates a partially cutaway, front elevational view of reaction block 400 according to a preferred embodiment of the invention. As shown, reaction block 400 includes array of reaction wells 402 in which each reaction well 404 is disposed through reaction block 400. Reaction well 404 includes inlet portion 406, which extends upward from upper surface 410 of reaction block body 412, and outlet portion 408 (e.g., an outlet spout, etc.), which extends downward from lower surface 414 of reaction block body 412. As also shown, reaction block 400 includes cavities 416 disposed between and proximal to inlet portions of adjacent reaction wells, e.g., to direct fluidic materials away from other inlet portions in the event fluid is spilled, e.g., while reaction block 400 is unsealed. Outlet portion 408 includes a smaller inner cross-sectional dimension than other regions of reaction well 404. Transition area 418 between outlet portion 408 and the other regions in reaction well 404 is abrupt. In other embodiments, transition area 418 is, e.g., tapered, stepped, or the like. Although not shown in FIG. 4A, a filter (e.g., a disk of filtering material, etc.) is typically disposed proximal to transition area 418, e.g., to prevent resin or other reaction components from flowing into outlet portion 408 during solid-phase synthesis. Reaction block 400 also includes substantially opposing recessed regions 420 disposed in opposing surfaces of reaction block 400 proximal to a midpoint of each surface. Opposing recessed regions 420 are used to mount or seat lid attachment components, e.g., a band (not shown) with attached latch bodies, latch clasps, and/or hinge components. Lid attachment components are discussed further below.

Figure 4B:
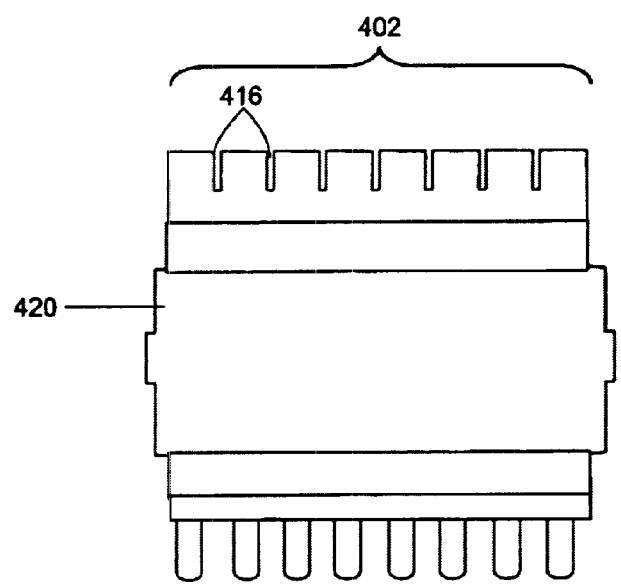
FIG. 4B schematically illustrates the reaction block of FIG. 4A from a side elevational view.
Figure 4C:
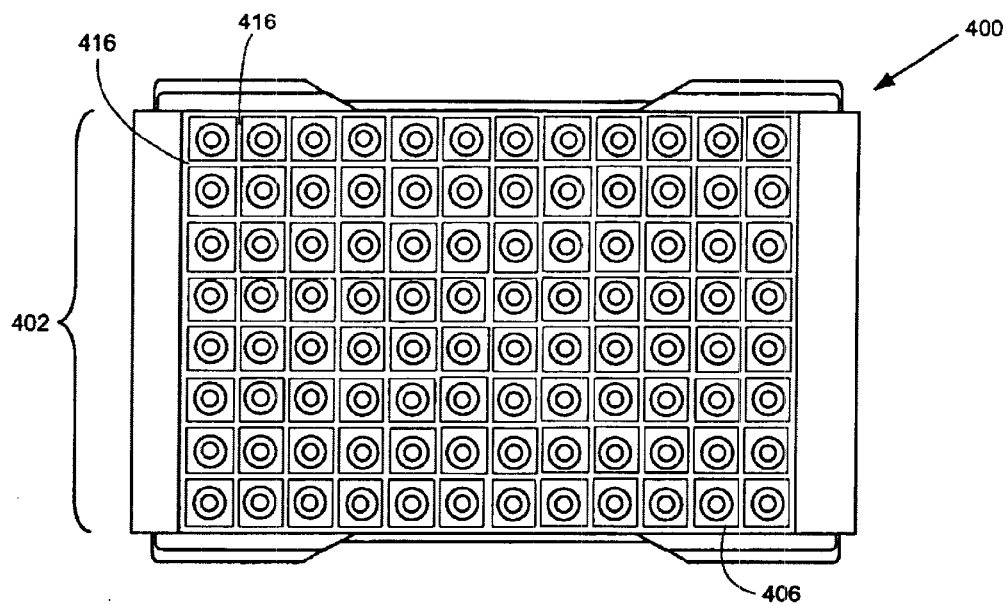
FIG. 4C schematically shows the reaction block of FIG. 4A from a top plan view.
Figure 4D:
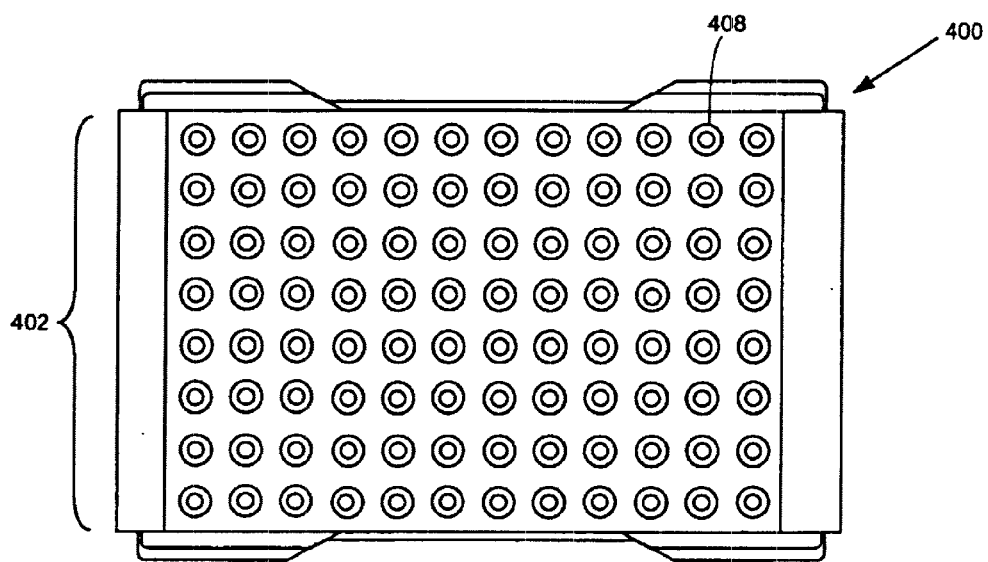
FIG. 4D schematically illustrates the reaction block of FIG. 4A from a bottom plan view.
Figure 4E:
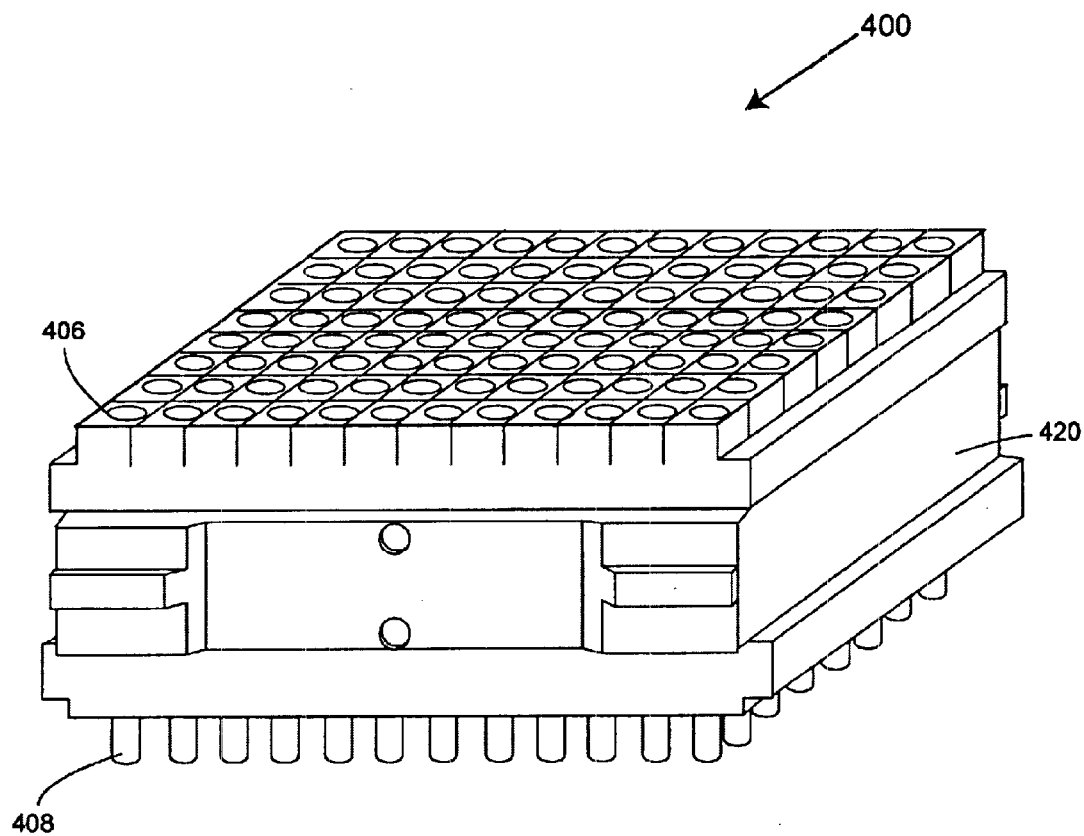
FIG. 4E schematically depicts the reaction block of FIG. 4A from a perspective view.

FIGS. 4B–E schematically depict reaction block 400 from various viewpoints. In particular, FIG. 4B schematically illustrates reaction block 400 from a side elevational view. FIG. 4C schematically shows reaction block 400 from a top plan view, whereas FIG. 4D schematically illustrates reaction block 400 from a bottom plan view. FIG. 4E schematically depicts reaction block 400 from a perspective view.

The reaction blocks of the present invention optionally include various numbers and arrays of reaction wells. For example, in certain embodiments reaction blocks include, e.g., 6, 12, 24, 48, 96, 384, 1536, or other numbers of reaction wells. As shown in FIG. 4C, for example, reaction block 400 includes 96 reaction wells arrayed in a rectangular 8×12 format. In preferred embodiments, outlet portions or spouts of reaction wells have footprints that correspond to wells in a micro-well plate or other sample container (e.g., plates having 6, 12, 24, 48, 96, 384, 1536, or other numbers of wells). For example, outlet portions or spouts of reaction blocks are optionally spaced at regular intervals, such as 9 mm centers for 96 well plates, 4.5 mm centers for 384 well plates, 2.25 mm centers for 1536 well plates, or the like. The overall dimensional area of a reaction block generally provide a footprint of about the same size as a selected standard micro-well plate to permit interchangeable use of the reaction block with standard equipment holders, automated well washers, X-Y-Z translational devices, or the like. It will be appreciated that the present invention may use any of a variety of arrays other than the format depicted in, e.g., FIG. 4C, such as non-rectangular arrays of reaction wells.

As referred to above, individual reaction wells of reaction blocks typically include inlet portions (see, e.g., inlet portion 406 in FIG. 4A) and outlet portions (see, e.g., inlet portion 408 in FIG. 4A). Inlet and outlet portions of a particular reaction well are typically in fluid communication with one another via a cavity disposed through a reaction block body and are, e.g., integrally fabricated with the reaction block body. Reaction block fabrication is described further below. As mentioned above, in preferred embodiments, inlet portions are separated from one another by a series of cavities (e.g., orthogonally intersecting cavities (see, e.g., cavities 416 in FIG. 4C), etc.). The cavities are typically narrow voids between adjacent inlet portions that extend vertically, e.g., from the upper surface of a reaction block body to the tops of the inlet portions. Cavities such as these are generally fabricated to reduce cross-contamination among reaction wells, e.g., in the event fluidic materials are spilled when the top lid and gasket sheet are not positioned to seal the reaction wells. In particular, the cavities direct fluids away from the reaction wells. Outlet portions are typically formed as outlet spouts (see, e.g., FIG. 4A) having, e.g., slightly tapered shapes (e.g., as a Luer tip) to which commercially available syringe needle hubs are optionally attached. Such needles are optionally attached to outlet spouts, e.g., when a smaller effluent opening is desired to elute very small volumes from reaction wells, when transferring sensitive fluidic materials under an inert atmosphere from reaction wells, or the like. Tapered outlet spouts also assist in directing fluid streams and reducing cross-contamination of eluted materials.

Reaction well dimensions (e.g., internal length or height, cross-sectional dimension/area, or the like) are typically selected according to the volume of fluidic material desired for containment within a particular well. For example, reaction wells of the present invention generally include volume capacities of between about 0.1 ml and about 100 ml, typically between about 1 ml and about 50 ml, more typically between about 1 ml and about 25 ml, and still more typically between about 1 ml and about 2 ml. Optionally, reaction blocks are designed to accommodate fluid volumes in excess of about 100 ml. In certain embodiments, different reaction wells in a given reaction block include different fluid volume capacities. In preferred embodiments, each well in a reaction block includes about the same fluid volume capacity. Additional reaction well configurations, e.g., which effectively increase individual well volumes without altering reaction block footprints, that are optionally adapted to the reaction blocks of the present invention are described in, e.g., U.S. Pat. No. 6,054,100, entitled "APPARATUS FOR MULTI-WELL MICROSCALE SYNTHESIS," to Stanchfield et al., issued Apr. 25, 2000, which is incorporated by reference in its entirety for all purposes.

A reaction well, or a portion thereof, optionally includes uniform inner or outer cross-sectional dimensions. However, at least two regions of a particular reaction well typically include different inner or outer cross-sectional dimensions. For example, in preferred embodiments, an outlet portion is formed as an outlet spout, which includes a smaller inner cross-sectional dimension than other regions of the reaction well. In these embodiments, internal transitional areas between, e.g., outlet spouts and other regions within a reaction well are abrupt or gradual (e.g., tapered, incremental, stepped, or the like). These transitional areas optionally serve as a seat for a filter, which is used, e.g., in certain solid-phase synthesis reactions. Filters are described further below. Although schematically depicted in, e.g., FIG. 4C as having a substantially cylindrical shape (i.e., a circular cross-section), reaction wells of the present invention optionally include other cross-sectional shapes. To illustrate, at least a segment of a reaction well optionally includes an inner and an outer cross-sectional shape independently selected from, e.g., a regular n-sided polygon, an irregular n-sided polygon, a triangle, a square, a rounded square, a rectangle, a rounded rectangle, a trapezoid, a circle, an oval, or the like. Rounded internal reaction well surfaces are generally preferred to reduce undesirable fluid wicking which typically occurs with angled internal well surfaces.

Filters are typically utilized in the parallel reaction devices of the present invention, e.g., to retain solid supports or resins within reaction wells (e.g., during various solid-phase synthesis protocols, etc.) and/or to filter fluidic materials (e.g., when eluting solvents or other solution components from solid supports during various post-reaction work-up procedures). Filters generally have shapes corresponding to inner cross-sectional shapes of reaction wells and are typically press fitted into reaction wells, such that they are seated proximal to transitional areas between outlet portions and other regions of reaction wells. Essentially any material, e.g., capable of retaining the selected resin size in the reaction well is optionally used as a filter in the devices of the invention. In preferred embodiments, the filters are frits of glass or plastic. For example, in certain embodiments, filters include semi-permeable membranes that retain material based upon size. Suitable semi-permeable membrane materials generally include a pore sizes of at least about 1 nm. For example, semi-permeable membrane materials optionally utilized in the devices of the invention includes pore sizes of between about 1 $\mu$m and about 100 $\mu$m, typically between about 5 $\mu$m and about 50 $\mu$m, and more typically between about 10 $\mu$m and about 25 $\mu$m.

More specifically, suitable semi-permeable membrane materials are optionally selected from, e.g. polyaramide membranes, polycarbonate membranes, porous plastic matrix membranes (e.g., POREX® Porous Plastic, etc.), porous metal matrix membranes, polyethylene membranes, poly(vinylidene difluoride) membranes, polyamide membranes, nylon membranes, ceramic membranes, polyester membranes, polytetrafluoroethylene (TEFLON™) membranes, woven mesh membranes, microfiltration membranes, nanofiltration membranes, ultrafiltration membranes, dialysis membranes, composite membranes, hydrophilic membranes, hydrophobic membranes, polymer-based membranes, a non-polymer-based membranes, powdered activated carbon membranes, polypropylene membranes, glass fiber membranes, glass membranes, nitrocellulose membranes, cellulose membranes, cellulose nitrate membranes, cellulose acetate membranes, polysulfone membranes, polyethersulfone membranes, polyolefin membranes, or the like. Filters (e.g., semi-permeable membrane materials) optionally used in the present invention are widely available from various commercial suppliers, such as, P. J. Cobert Associates, Inc. (St. Louis, Mo.), Millipore Corporation (Bedford, Mass.), or the like. Additional details regarding filtration and membranes are described in various publications including, e.g., Ho and Sirkar (Eds.), *Membrane Handbook*, Van Nostrand Reinhold (1992), Cheryan, *Ultrafiltration and Microfiltration Handbook*, $2^{nd}$ Ed., Technomic Publishing Company (1998), and Mulder, *Basic Principles of Membrane Technology*, $2^{nd}$ Ed., Dordrecht: Kluwer (1996).

Reaction blocks of the present invention are typically fabricated as single integral units. Optionally, reaction blocks are assembled from individually fabricated component parts (e.g., individual reaction wells, etc). Reaction block fabrication materials or substrates are generally selected according to properties, such as reaction inertness, durability, expense, or the like. In preferred embodiments, reaction blocks, or components thereof, are fabricated from various polymeric materials such as, polytetrafluoroethylene (TEFLON™), polypropylene, polystyrene, polysulfone, polyethylene, polymethylpentene, polydimethylsiloxane (PDMS), polycarbonate, polyvinylchloride (PVC), polymethylmethacrylate (PMMA), or the like. Polymeric parts are typically economical to fabricate, which affords reaction block disposability (i.e., replacing the reaction block without replacing other device components, such as lids or attachment components). Reaction blocks or component parts are also optionally fabricated from other materials including, e.g., glass, metal (e.g., stainless steel, anodized aluminum, etc.), silicon, or the like. For example, reaction blocks are optionally assembled from a combination of materials permanently or removably joined or fitted together, e.g., polymer or glass reaction wells with a stainless steel frame to position the reaction wells relative to one another.

The reaction blocks or reaction block components are optionally formed by various fabrication techniques or combinations of such techniques including, e.g., injection molding, cast molding, machining, embossing, extrusion, etching, or other techniques. These and other suitable fabrication techniques are generally known in the art and described in, e.g., Rosato, *Injection Molding Handbook*, $3^{rd}$ Ed., Kluwer Academic Publishers (2000), *Fundamentals of Injection Molding*, W. J. T. Associates (2000), Whelan, *Injection Molding of Thermoplastics Materials*, Vol. 2, Chapman & Hall (1991), Fisher, *Extrusion of Plastics*, Halsted Press (1976), and Chung, *Extrusion of Polymers: Theory and Practice*, Hanser-Gardner Publications (2000). After reaction block fabrication, reaction blocks or components thereof, such as reaction wells, are optionally further processed, e.g., by coating surfaces with, e.g., a hydrophilic coating, a hydrophobic coating, or the like.

In preferred embodiments, reaction blocks of the invention are fabricated with opposing recessed regions, which are used to mount a band that includes various attachment components. Attachment components are described in greater detail below. To illustrate, a reaction block typically includes a pair of substantially opposing recessed regions disposed (e.g., fabricated) in opposing surfaces of the reaction block proximal to a midpoint of each surface. Optionally, reaction blocks are fabricated with multiple pairs of opposing recessed regions disposed in opposing reaction block surfaces. For example, in one embodiment, the reaction block includes a substantially continuous recessed region disposed on each of four sides of the reaction block. In still other embodiments, the reaction blocks include multiple pairs of opposing recessed regions, e.g., to mount multiple bands with attachment components.

In certain embodiments, attachment components are fabricated as integral parts of reaction blocks. For example, attachment components, such as hinge components (e.g., male or female lift-off hinge components, etc.), latch components (e.g., keeper plates, latch bodies, etc.), or the like are fabricated as components of reaction block surfaces, e.g., using injection molding or other fabrication techniques as described above.

IV. Attachment Components

The parallel reaction devices of the present invention include various attachment components for attaching top and bottom lids to reaction blocks. As described above, a preferred embodiment of a reaction block of the invention includes at least one pair of substantially opposing recessed regions disposed in opposing surfaces of the reaction block proximal to a midpoint of each surface, which opposing recessed regions mount the top and bottom attachment components. In this embodiment, the top and bottom attachment components generally include a band disposed around the reaction block in the opposing recessed regions in which the band includes at least one first top hinge component (e.g., a pair of hinge components, etc.), at least one first top latch component, at least one first bottom hinge component (e.g., a pair of hinge components, etc.), and at least one first bottom latch component. At least one second top hinge component (e.g., a pair of hinge components, etc.) and at least one second top latch component are typically attached to the top lid in which the second top hinge component(s) removably engage(s) the first top hinge component(s) and the second top latch component(s) removably engage(s) the first top latch component(s). At least one second bottom hinge component (e.g., a pair of hinge components, etc.) and at least one second bottom latch component are typically attached to the bottom lid in which the second bottom hinge component(s) removably engage(s) the first bottom hinge component(s) and the second bottom latch component(s) removably engage(s) the first bottom latch component(s). Each hinge component optionally independently includes a male or a female lift-off hinge component or another type of hinge component, whereas each latch component optionally independently includes a latch body (e.g., a rotatable draw latch body or the like), a keeper plate, or the like.

The methods of attaching lids to reaction blocks in the devices of the invention provide significant advantages relative to prior art devices. In particular, a preferred embodiment of the invention includes a single latch for each lid of a given device. This provides for facile, rapid, and safe access to reaction wells within reaction blocks, e.g., for adding reagents to the wells, for removing fluidic materials, for washing the wells, or the like. Access to prior art devices typically includes manipulating multiple clips, screws, and/or other components, which limits throughput and is often unsafe. The ease with which reaction wells are accessed in the devices of the invention is further enhanced in embodiments that include removable lids. In addition, lids are optionally opened (and removed, in embodiments that include removable hinges) independently of one another. The arrangements of hinges and latch components also generates substantially even clamp loads or forces across inlet or outlet portions of reaction wells to uniformly compress gaskets and to securely seal reaction wells, which prevents reaction failure and cross-contamination among reaction wells due to sample leakage. Hinge and latch configurations of the devices of the invention also ensure that lids (and protrusions disposed on lid surfaces) are properly aligned with reaction blocks and with one another when attached to reaction blocks.

Figure 5A:
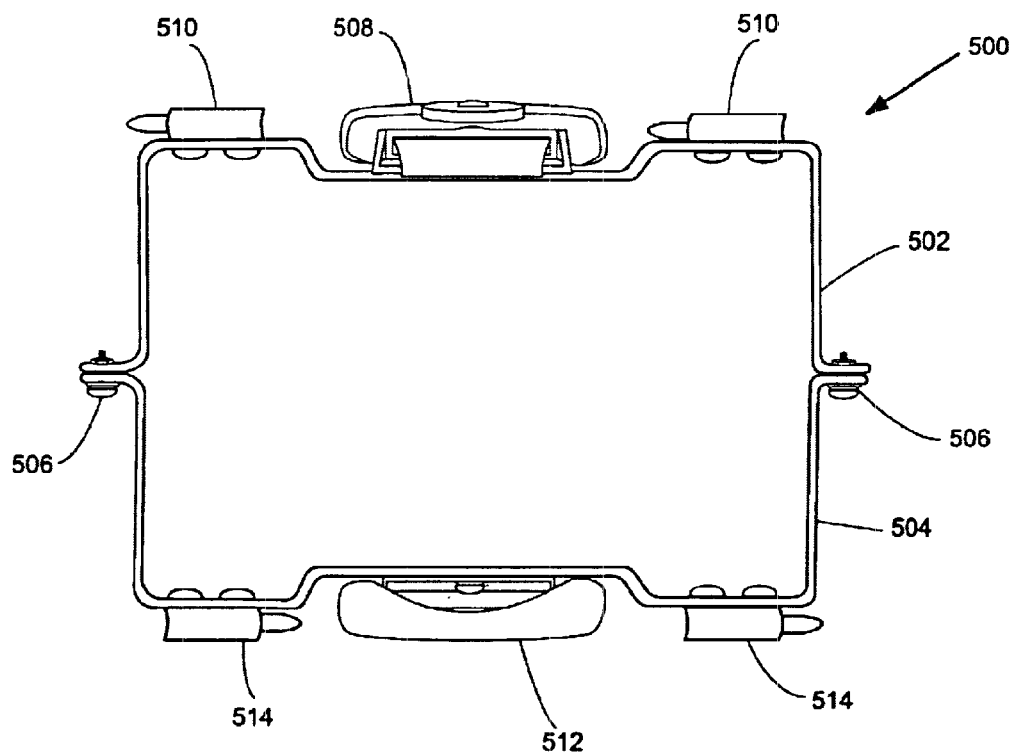
FIG. 5A schematically shows a top plan view of one embodiment of a band according to the present invention.
Figure 5B:
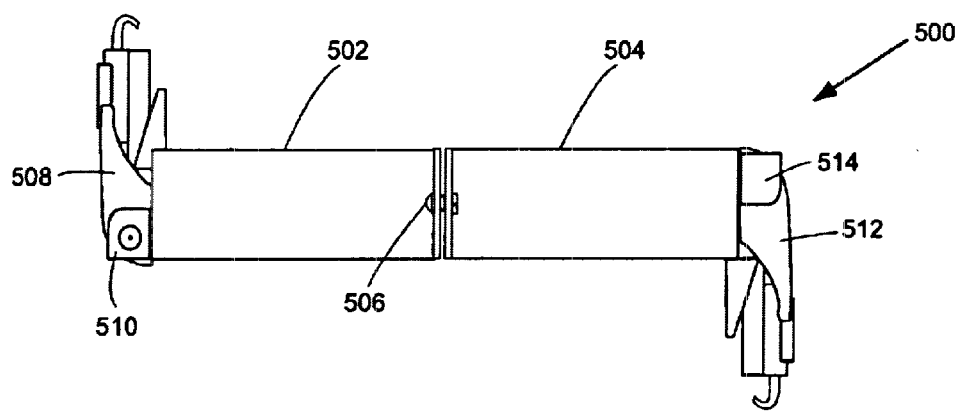
FIG. 5B schematically illustrates a side plan view of the band of FIG. 5A.
Figure 5C:
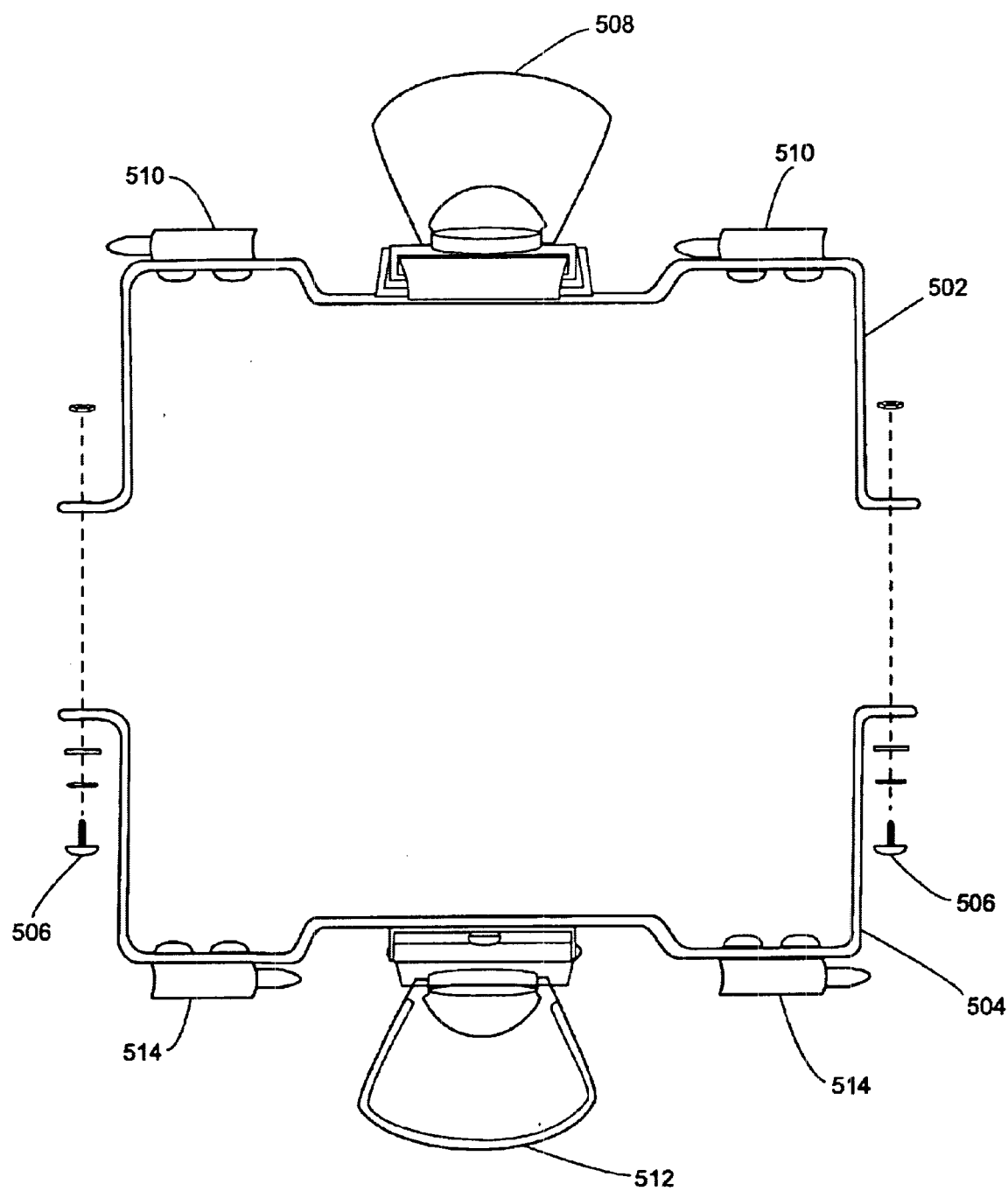
FIG. 5C schematically depicts an exploded top view of the band of FIG. 5A.
Figure 5D:
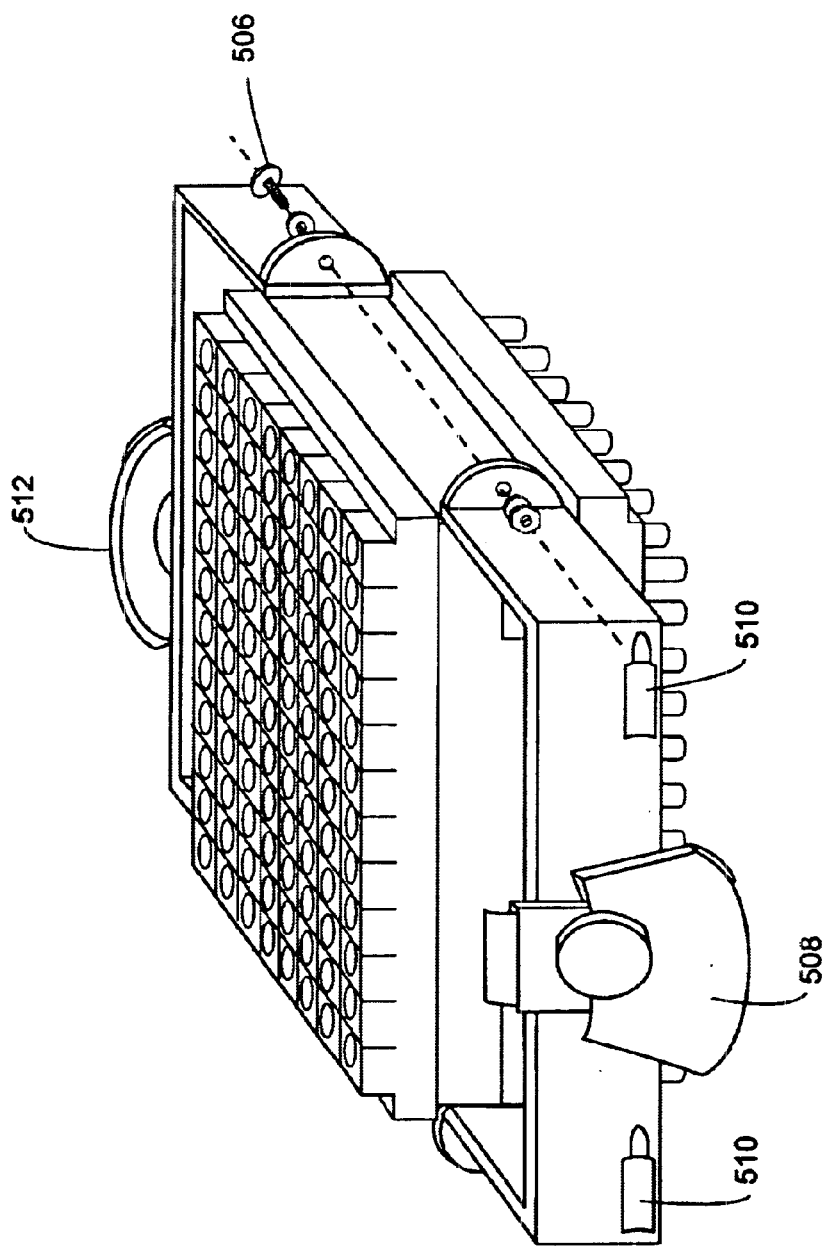
FIG. 5D schematically shows an exploded perspective view of a band being mounted in opposing recessed regions disposed on opposing surfaces of a reaction block according to a preferred embodiment of the invention.

FIG. 5A schematically shows a top plan view of an assembled band according to a preferred embodiment the present invention. As shown, assembled band 500 includes first band portion 502 and second band portion 504. First band portion 502 and second band portion 504 are attached to one another by fasteners 506 (e.g., bolts, rivets, screws, nuts, etc.). Optionally, bands for attachment components of the present invention are fabricated as single integral components or are composed of more than two portions. Bands are typically fabricated or machined using known techniques (e.g., conventional stamping and forming techniques, injection molding, etc.) from various materials, such as heavy gauge stainless steel sheet metal, durable plastics, or the like. As further shown, top latch body 508 (shown as a rotatable draw latch body) and bottom hinge components 510 (shown as male lift-off hinge components) are attached (e.g., screwed, riveted, bolted, welded, adhered, bonded, etc.) to first band portion 502, whereas bottom latch body 512 and top hinge components 514 are attached to second band portion 504. FIG. 5B schematically illustrates assembled band 500 from a side plan view. FIG. 5C schematically depicts an exploded top view of the band of FIG. 5A. FIG. 5D schematically shows an exploded perspective view of a band being mounted in opposing recessed regions disposed on opposing surfaces of a reaction block according to a preferred embodiment of the invention.

The attachment components of the present invention include various embodiments and optional configurations. For example, latch components are typically draw latch components, although other types of latching or clamping mechanisms may also be adapted for use with the devices of the present invention. Latch components generally include latch bodies and keepers, keeper plates, or other catches. Keepers or other catching devices, e.g., provide for latch body pawl retention. In preferred embodiments, latch bodies are rotatable draw latch bodies. Optionally, latch bodies are attached to reaction blocks, e.g., directly (i.e., integral with the reaction block) or via a band (see, e.g., FIG. 5A) with corresponding keeper plates attached to lids. Alternatively, latch bodies are attached to lids with corresponding keeper plates attached (e.g., directly or via a band) to the reaction block. Although a single latch per lid is typically preferred, other arrangements that include multiple latches per lid are optionally adapted to the devices of the invention.

In preferred embodiments, lids are removably attached to reaction blocks. Accordingly, hinge components, such as lift-off hinges that include male and female components are generally used in the devices of the invention. Male or female hinge components are typically attached to reaction blocks directly (e.g., fabricated as a molded part of a reaction block or the like) or indirectly via a band, as described above, with counterpart hinge components attached to lids. As shown in FIG. 5A, for example, hinge components 510 and 514 are male lift-off hinge components. In certain embodiments, female hinge components are attached to, e.g., a band. Although, two hinges are typically used per lid, other configurations are also optionally utilized. For example, a lid is optionally attached to a reaction block by two latches and a single hinge (e.g., a hinge centrally positioned on a reaction block or band to effect substantially even clamping force across reaction block inlet or outlet portions).

As shown in FIG. 5A, pairs of hinge components (see, e.g., bottom hinge components 510) are oriented to provide for removing the lid of a device. In certain embodiments, however, lids are optionally non-removable. In these embodiments, for example, one member of a pair of hinge components is typically oriented in the opposite direction from that depicted in, e.g., FIG. 5A. Optionally, other types of hinges, aside from lift-off hinges are utilized in the devices of the invention. Suitable hinges and latching mechanisms that are optionally adapted for use with the devices of the present invention are generally known in the art. These attachment components are optionally fabricated by known techniques, such as injection or cast molding, etc. from various materials including, e.g., steel, stainless steel, plastic, rubber, elastomers, or the like. Attachment components such as the hinges and latching mechanisms described herein are also optionally acquired from assorted commercial suppliers including, e.g., Southco, Inc. (Concordville, Pa.).

V. Lids

The parallel reaction devices of the present invention include top and bottom lids for sealing reaction wells of reaction blocks. Lids typically include attachment components, such as hinge and latch components which are capable of engaging corresponding attachment components disposed, e.g., on a reaction block band, as described above. In preferred embodiments, the top and bottom lids are removably attached to the reaction block and open independently of one another. Further, the top and bottom lids each typically include at least a first alignment structure complementary to at least a second alignment structure on, e.g., a controller apparatus to align the parallel reaction device relative to the controller apparatus. In addition, the lids produce a substantially even clamp load or force across inlets and outlets to reaction wells arrayed in reaction blocks to effectively seal the reaction wells without leakage.

Figure 6A:
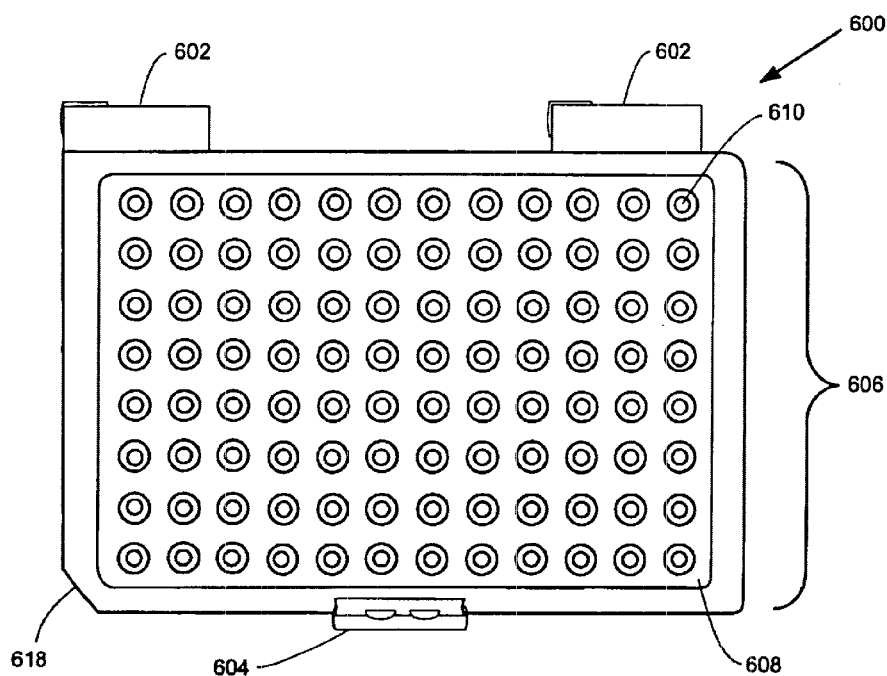
FIG. 6A schematically illustrates a top plan view of one embodiment of a top lid of a parallel reaction device of the invention.
Figure 6B:
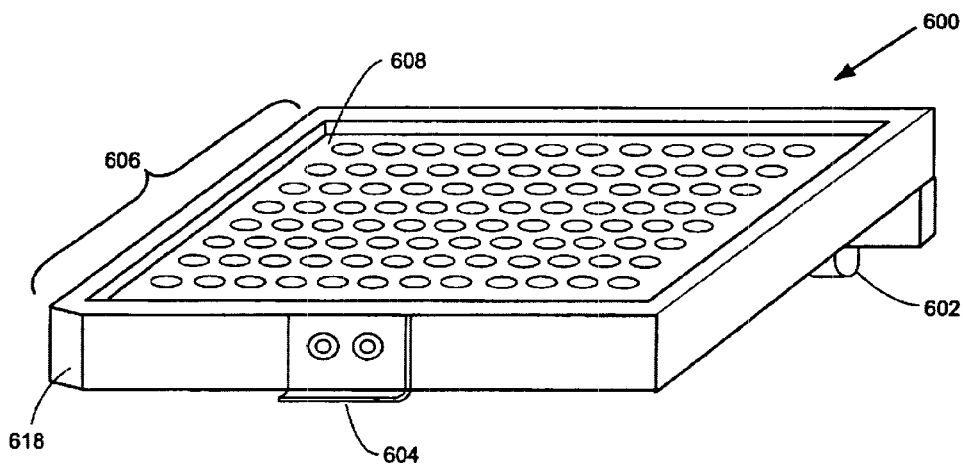
FIG. 6B schematically shows a top perspective view the top lid of FIG. 6A.

FIG. 6A schematically illustrates a top plan view of one embodiment of a top lid of a parallel reaction device of the invention. As shown, top lid 600 includes hinge components 602 (e.g., lift-off hinge components, as described above) and keeper plate 604 attached (e.g., screwed, riveted, adhered, bonded, or the like) to top lid 600. As described above, a latch body is optionally attached to top lid 600 instead of keeper plate 604. In an assembled device, top lid 600 produces a substantially even clamp load across all inlet portions of a reaction block. Also shown is array of apertures 606 disposed through top lid 600 in recessed top surface 608. In preferred embodiments, each aperture 610 axially aligns with a different reaction well in a reaction block and is tapered (e.g., having a larger cross-sectional dimension on the top surface of top lid 600 than on a bottom surface of top lid 600). The inclusion of apertures allows, e.g., fluidic materials (e.g., reagents, buffers, or the like) to be introduced into or removed from reaction wells through, e.g., needles of syringes. For example, a needle optionally pierces a gasket disposed between a reaction block and top lid 600 in an assembled device, as necessary according to the particular protocol being performed. Apertures also allow for the establishment and/or maintenance of an inert atmosphere in a reaction well through, e.g., a needle-fitted tube, which draws from, e.g., nitrogen, argon, or other gas sources. Tapered apertures are typically included to guide or otherwise facilitate the entry of needles into reaction wells. In certain embodiments, apertures are not included in top lids of parallel reaction devices. FIG. 6B schematically shows a top perspective view top lid 600.

Figure 6C:
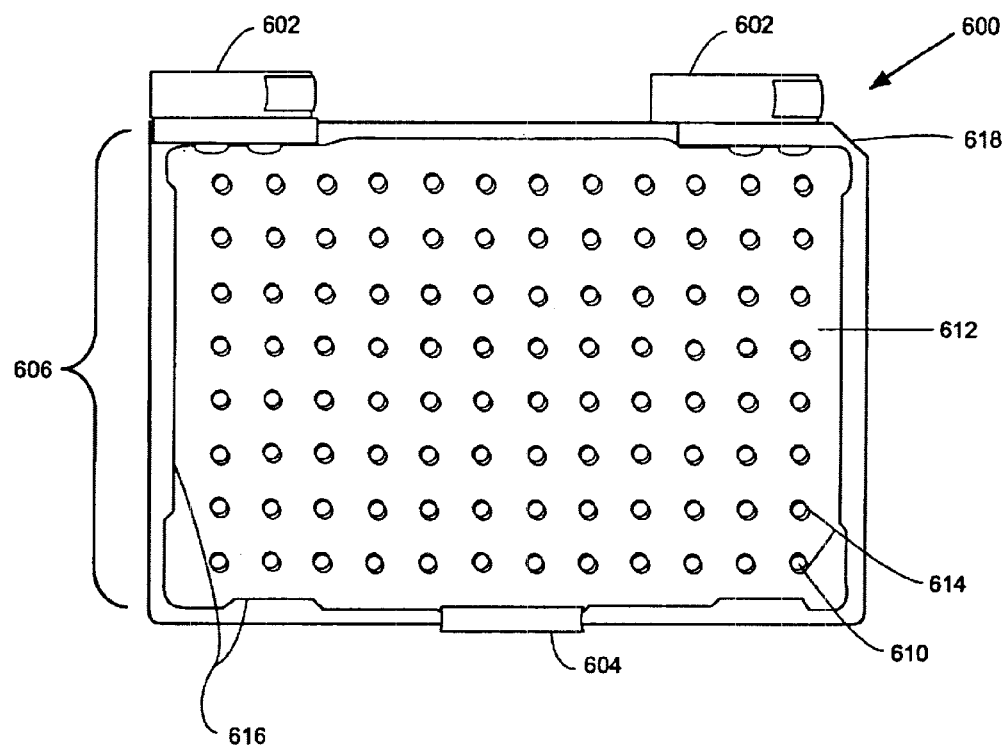
FIG. 6C schematically illustrates a bottom plan view of the top lid of FIG. 6A.
Figure 6D:
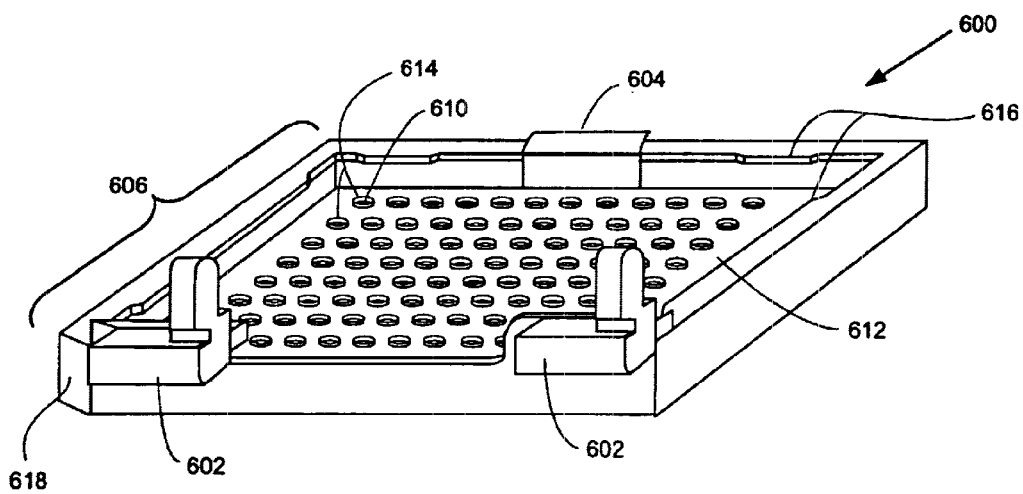
FIG. 6D schematically depicts a bottom perspective view of the top lid of FIG. 6A.

FIG. 6C schematically illustrates a bottom plan view of top lid 600, whereas FIG. 6D schematically depicts a bottom perspective view of top lid 600. As shown, recessed bottom surface 612 includes protruding annular ridges 614 disposed around each aperture 610. In an assembled device, protruding annular ridges 614 press a top gasket into contact with inlet portions of reaction wells to radially seal the inlet portions. The radial seals produced by protruding annular ridges 614 prevent leakage of fluidic materials from the inlet portions, e.g., to reduce cross-contamination among reaction wells. Protrusions such as those depicted in FIGS. 6C and D typically extend between about 0.5 mm and about 5 mm from recessed bottom surface 612 and more typically between about 1 mm and about 3 mm from recessed bottom surface 612. Arrays of protrusions are also typically included on bottom surfaces of top lids even in the absence of apertures. Such protrusions are optionally formed (e.g., fabricated as an integral component of the lid) as annular ridges, knobs, mounds, cones, or any other structure that effectively radially seals the reactions wells of the devices of the invention. A gasket (e.g., a sheet gasket) is typically disposed in recessed bottom surface 612, which positions the gasket relative to the reaction wells of the reaction block in an assembled device. Top lip 600 also includes lateral overhangs 616, which retain the gasket in position even when top lid 600 is not latched to the device. Top lid 600 additionally includes alignment structure 618, e.g., for aligning a parallel reaction device relative to components of a controller device, such as a translational stage or the like.

Figure 7A:
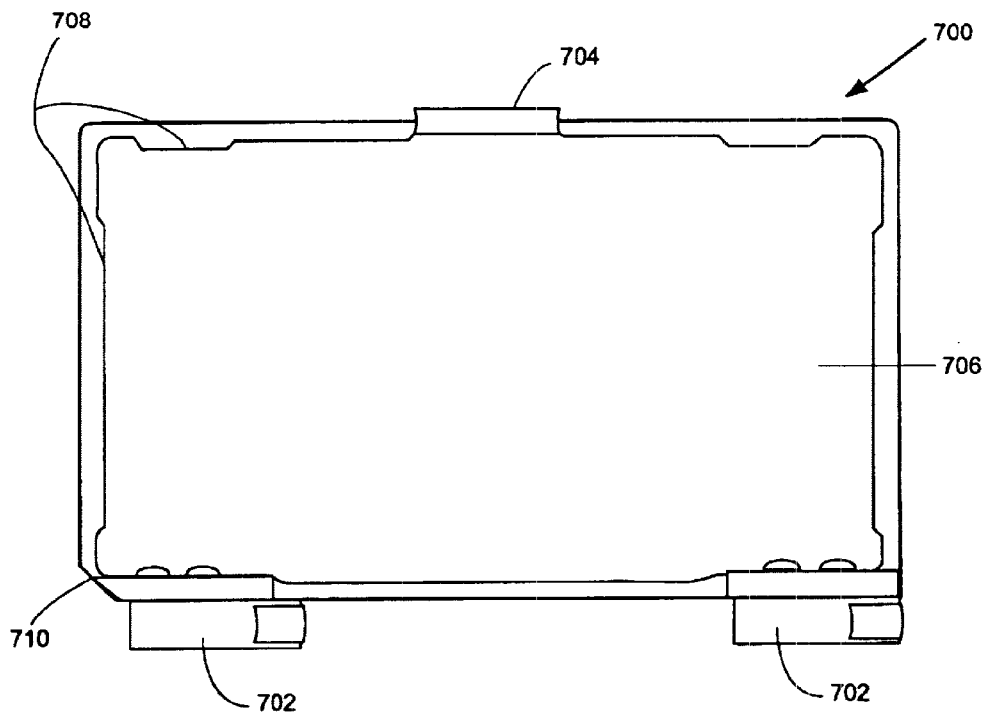
FIG. 7A schematically shows a top plan view of one embodiment of a bottom lid of a parallel reaction device according to the present invention.
Figure 7B:
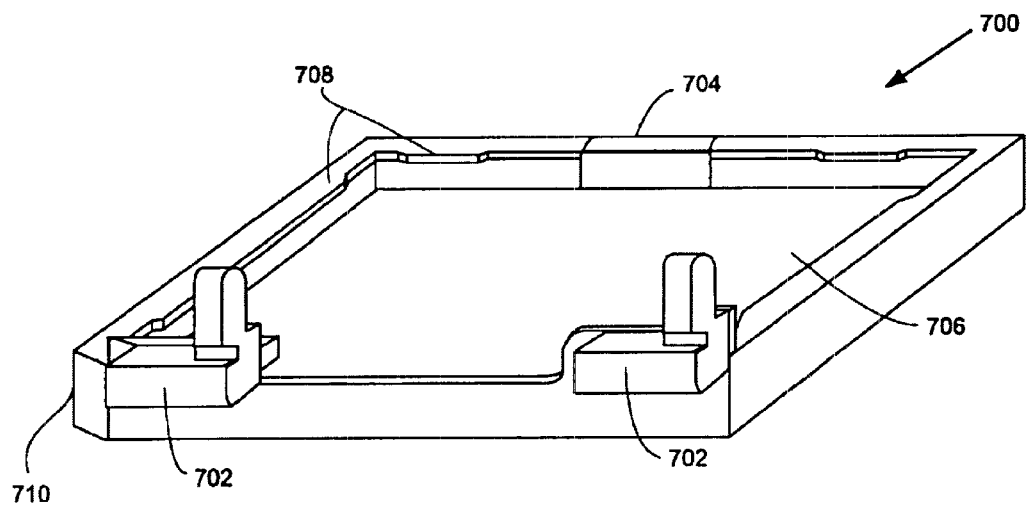
FIG. 7B schematically illustrates a top perspective view of the bottom lid of FIG. 7A.
Figure 7C:
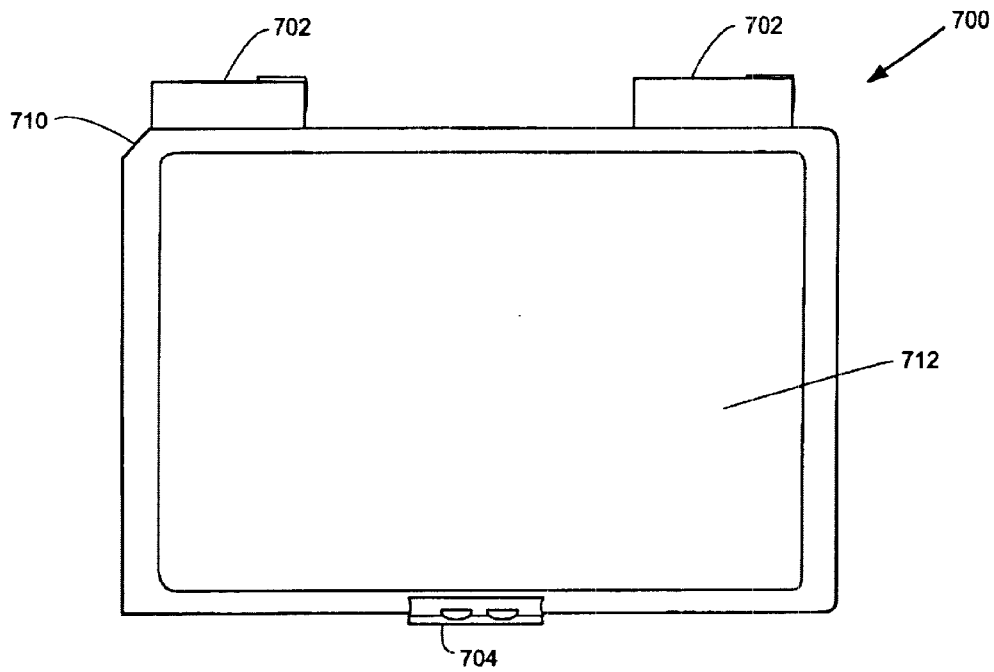
FIG. 7C schematically depicts a bottom plan view of the bottom lid of FIG. 7A.
Figure 7D:
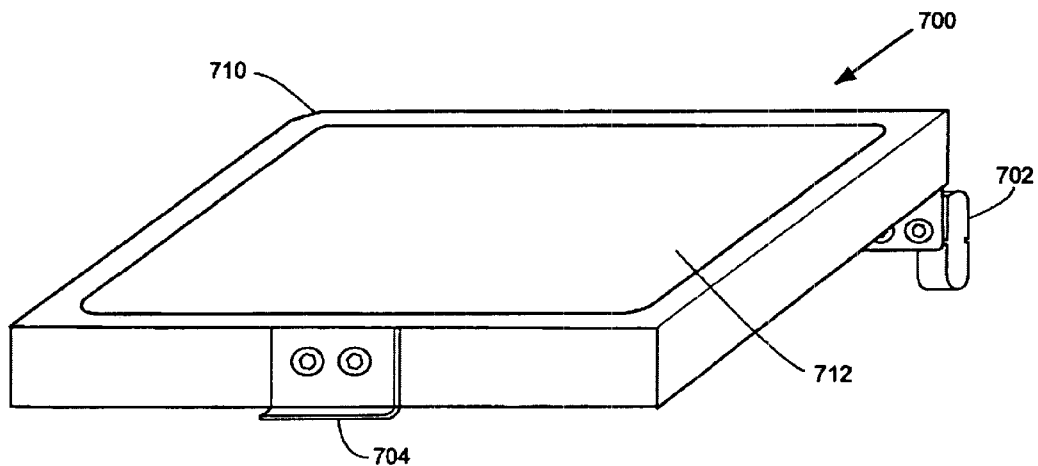
FIG. 7D schematically illustrates a bottom perspective view of the bottom lid of FIG. 7A.

FIG. 7A schematically shows a top plan view of one embodiment of a bottom lid of a parallel reaction device according to the present invention. As shown, bottom lid 700 includes hinge components 702 (e.g., lift-off hinge components, as described above) and keeper plate 704 attached to bottom lid 700. Latch bodies are optionally attached to bottom lid 700 instead of keeper plates. In an assembled device, bottom lid 700 produces a substantially even clamp load across all outlet portions of a reaction block. With top lids shut, bottom lids may be opened without loss of fluidic materials from reaction wells due to the effective vacuum produced within reaction wells by the securely sealed inlet portions of reaction blocks. Bottom lid 700 includes recessed top surface 706 in which a gasket is typically disposed in an assembled device. To hold a gasket in position, bottom lid 700 also includes lateral overhangs 708. Although not shown, bottom lid 700 optionally further includes, e.g., an array of protrusions similar to those described above with respect to top lid 600 disposed on recessed top surface 706. Such an array of protrusions presses a bottom gasket into contact with the outlet portions of the reaction wells to seal the outlet portions in an assembled device. In certain embodiments, bottom lids also include arrays of apertures disposed through the lids, which apertures axially align with outlet portions of reaction blocks, e.g., for sample extraction from reaction wells via needles (e.g., syringe needles, etc.) or the like. Similar to top lid 600 (discussed above), bottom lid 700 also includes alignment structure 710. FIG. 7B schematically illustrates bottom lid 700 from a top perspective view. In addition, FIG. 7C schematically depicts bottom lid 700 from a bottom plan view, whereas FIG. 7D schematically illustrates bottom lid 700 from a bottom perspective view. As further shown in FIGS. 7C and D, bottom lid 700 includes recessed bottom surface 712.

The lids of the present invention typically each have a footprint that is dimensionally about the same as a standard multi-well plate, such that an assembled parallel reaction device may, e.g., be placed into the holders of automated devices designed for standard micro-well plates. The lids of the devices of the invention are typically fabricated from various durable materials including, e.g., metallic materials (e.g., steel, stainless steel, anodized aluminum alloys, etc.) or certain polymeric materials. Generally, any sturdy, non-corrosive material suitable for laboratory conditions may be employed. Furthermore, lids are typically fabricated utilizing various well-known techniques, such as injection molding, cast molding, machining, or the like.

VI. Gaskets

To effectively seal the reaction wells in the devices of the present invention, gaskets are generally disposed between lids and the reaction block in assembled devices. In preferred embodiments, top and bottom gaskets are sheets of gasketing material. Gaskets are typically disposable or consumable components of the parallel reaction devices of the invention. In particular, gasket sheets suitable for use in the devices of the present invention are optionally made from essentially any chemically resistant rubber or elastomeric material, many of which are well known in the art. For example, suitable gasket sheets are optionally fabricated from, e.g., Viton®, Santoprene®, Teflon®, Gore-Tex®, Celerus™, or the like. Many of these materials are readily available from various commercial suppliers, such as W. L. Gore & Associates (Newark, Del.). Combinations of materials, e.g., in the form of laminates are also optionally utilized as gasketing sheets in the devices of the invention. Gasket materials are also typically selected based upon abilities to maintain seals without leakage of fluidic materials even after sustaining repeated punctures and withdrawals of syringe needles. This characteristic is especially significant for top gaskets in devices of the present invention that include arrays of apertures in top lids, as described above.

Figure 8:
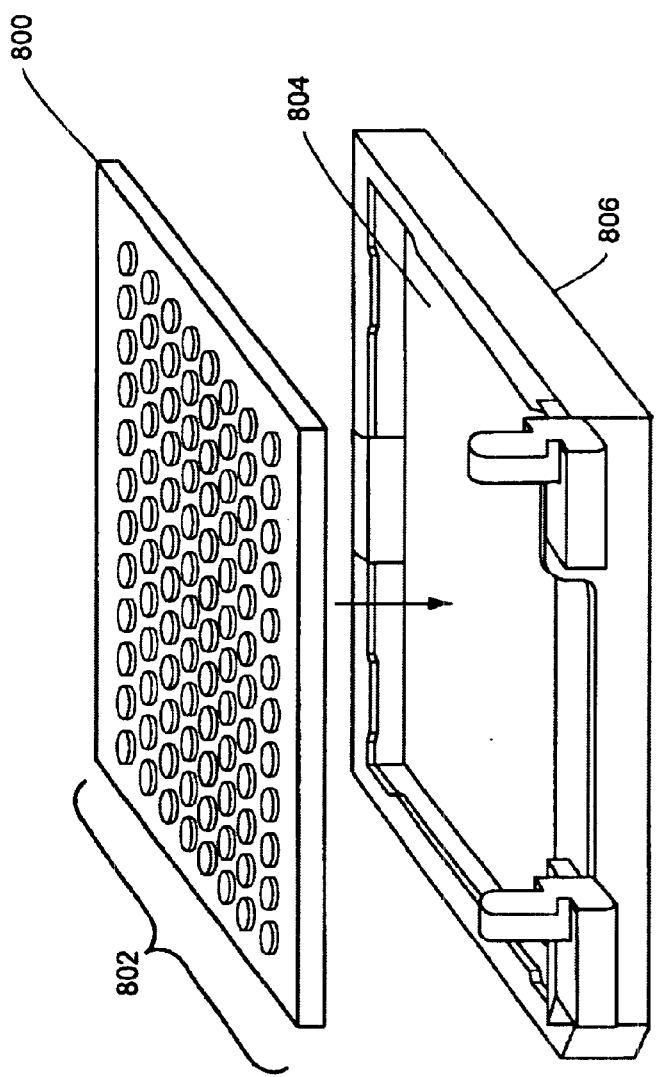
FIG. 8 schematically shows a perspective view of a gasket sheet that includes an array of protrusions disposed over a lid according to one embodiment of the invention.

In certain embodiments, gaskets are fabricated with at least one protrusion disposed on a surface, which protrusion axially aligns with, e.g., an inlet or outlet portion of a reaction block. Such protrusions are included to further effect radial seals of reaction wells in the devices of the invention. In these embodiments, the at least one protrusion typically includes an array of protrusions in which each protrusion in the array axially aligns with a different reaction well in a reaction block. An example gasket sheet that includes an array of protrusions that correspond to reaction wells in a 96-well reaction block is schematically illustrated in FIG. 8. As shown in perspective view, gasket sheet 800 includes array of protrusions 802 disposed on a surface that engages a reaction block in an assembled device. As also shown, gasket sheet fits into recessed area 804 of lid 806. In certain embodiments, gasket sheets (e.g., cap mats, etc.) that include arrays of protrusions are also used with lids that include arrays of protrusions, such as those described above. In other embodiments, multiple gasket sheets (e.g., 2, 3, 4, etc.) are disposed between a lid and reaction block surface. In these embodiments, one or more of the multiple gasket sheets optionally include arrays of protrusions.

VII. Reaction Block Containers

The invention also provides reaction block containers, which typically include non-disposable components of the parallel reaction devices described herein. In particular, reaction block containers generally include attachment components (e.g., bands, hinge components, latch components, etc.), top lids, and bottom lids. Components of reaction block containers of the invention are described in greater detail above.

In one embodiment, a reaction block container includes a band that includes at least one first top hinge component, at least one first top latch component, at least one first bottom hinge component, and at least one first bottom latch component. Portions of the band are capable of being mounted in opposing recessed regions on a reaction block. The reaction block container also includes a top lid that includes at least one second top hinge component and at least one second top latch component attached to the top lid. The second top hinge component(s) engage(s) the first top hinge component(s) and the second top latch component(s) removably engage(s) the first top latch component(s). In addition, the reaction block container includes a bottom lid that includes at least one second bottom hinge component and at least one second bottom latch component attached to the bottom lid. The second bottom hinge component(s) engage(s) the first bottom hinge component(s) and the second bottom latch component(s) removably engage(s) the first bottom latch component(s).

In another embodiment, a reaction block container of the invention includes a band that includes at least one first top hinge component, at least one first top latch component, at least one first bottom hinge component, and at least one first bottom latch component. Portions of the band are capable of being mounted in opposing recessed regions on a reaction block. The reaction block container further includes a top lid that includes at least one protrusion (e.g., an array of protrusions or the like) disposed on a surface that engages a reaction block. The protrusion(s) is/are capable of pressing a gasket into contact with at least a portion of a reaction well(s) of the reaction block. The top lid also includes at least one second top hinge component and at least one second top latch component attached to the top lid. The second top hinge component(s) engage(s) the first top hinge component(s) and the second top latch component(s) removably engage(s) the first top latch component(s). The reaction block container additionally includes a bottom lid that includes at least one second bottom hinge component(s) and at least one second bottom latch component(s) attached to the bottom lid. The second bottom hinge component(s) engage(s) the first bottom hinge component(s) and the second bottom latch component(s) removably engage(s) the first bottom latch component(s).

Figure 9:
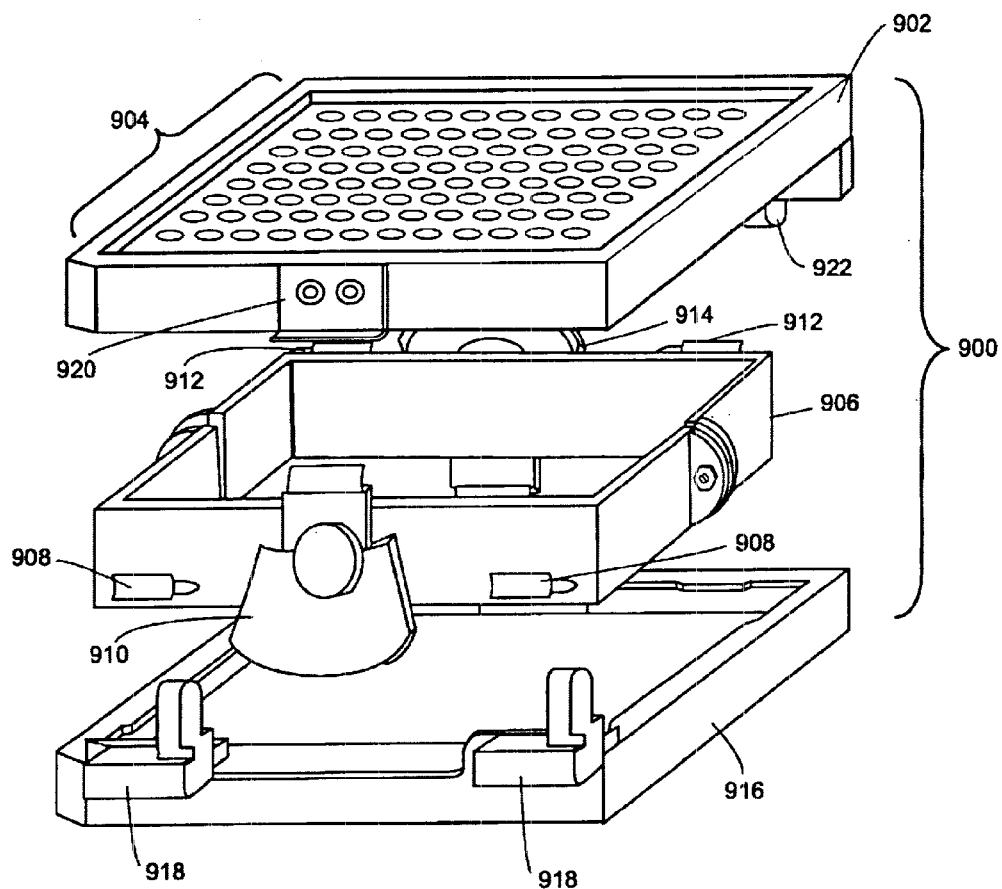
FIG. 9 schematically shows an exploded perspective view of reaction block container according to one embodiment of the invention.

In preferred embodiments, the top lids of the reaction block containers of the invention also include an array of apertures disposed through the top lid. At least one aperture axially aligns with at least one reaction well disposed in a reaction block. Typically, each member of the array of apertures axially aligns with a different reaction well disposed in the reaction block. To illustrate, FIG. 9 schematically shows an exploded perspective view of reaction block container 900 according to one embodiment of the invention in which top lid 902 includes array of apertures 904. As additionally shown, reaction block container 900 also includes band 906 that includes bottom hinge components 908, top latch component 910, ton hinge components 912 and bottom latch component 914. Reaction block container 900 also includes bottom lid 916 which includes bottom hinge components 918 and a bottom latch component (not within view). To lid 902 also includes to latch component 920 and top hinge components 922. One top hinge component 922 is not within view.

VIII. Synthesis Systems

The present invention also provides synthesis systems (e.g., automated workstations or the like) that include the parallel reaction devices described herein, e.g., for synthesizing and screening combinatorial libraries. In addition to parallel reaction devices, a system of the invention typically includes other vessels (e.g., flasks, test tubes, micro-well plates (e.g., deep-well collection plates), or the like) and a handling system (including, e.g., bead handlers, fluid handlers, device carriers, etc.) configured to translocate solid supports (e.g., individual beads, tea-bags, microvessels, or other containers having multiple beads or other solid supports disposed therein) and/or reagents to and from the reaction blocks or other vessels. Additional details regarding solid support containers that are optionally used in the devices of the present invention, including those that provide for molecular tracking and identification are described in, e.g., U.S. Pat. No. 6,136,274, entitled "MATRICES WITH MEMORIES IN AUTOMATED DRUG DISCOVERY AND UNITS THEREFOR," to Nova et al., issued Oct. 24, 2000, which is incorporated by reference in its entirety for all purposes. Other system components optionally include, e.g., vacuum manifold systems for eluting fluidic materials from reaction wells, incubators/ovens for regulating temperatures within reaction wells, centrifuges, shakers or other agitation devices, or the like. The systems of the invention also typically include a detection system (e.g., a mass spectrometer or the like) to detect chemical or physical properties of selected members of, e.g., synthesized libraries, and a computer (e.g., an information appliance, digital device, or the like) operably connected to the handling, detection, and/or other systems. An example system is described below.

Additional details relating to synthesis systems, which are optionally adapted for use with the devices of the invention, and to the automation of combinatorial synthetic methods are described in, e.g., Cargill and Maiefski (1996) "Automated combinatorial chemistry on solid phase," *Lab. Robotics. Automation* 8:139–148, Zuckermann et al. (1992) "Design, construction and application of a fully automated equimolar peptide mixture synthesizer," *Int. J. Peptide Prot. Res.* 40:497–506, Castelino et al. (2000) "Automated sample storage for drug discovery," *Chim. Oggi.* 17:32–35, Davis and Swayze (2000) "Automated solid-phase synthesis of linear nitrogen-linked compounds," *Biotechnol. Bioeng.* 71:19–27, Groger et al. (2000) "1,3,5-Triazines, versatile industrial building blocks: Synthetic approaches and applications," *Chim. Oggi.* 18:12–16, Haag (2000) "Chemspeed Ltd.: Automated and unattended parallel synthesis integrating work-up and analysis," *Chimia* 54:163–164, Hu et al. (2000) "Automated solid-phase synthesis and photophysical properties of oligodeoxynucleotides labeled at 5'-aminothymidine with Ru(bpy)(2)(4-m-4'-cam-bpy)(2+)," *Inorg. Chem.* 39:2500–2504, Lewis et al. (2000) "Automated high-throughput quantification of combinatorial arrays," *American Pharmaceutical Review* 3:63–68, North (2000) "Implementation of analytical technologies in a pharmaceutical development organization-looking into the next millennium," *Journal of Automated Methods and Management in Chemistry* 22:41–45, and Keifer et al. (2000) "Direct-injection NMR (DI-NMR): A flow NMR technique for the analysis of combinatorial chemistry libraries," *Journal of Combinatorial Chemistry* 2; 151–171.

A. Controllers

The handling systems of the invention typically incorporate one or more controllers, either as separate or integral components, which are generally utilized, e.g., to regulate the quantities of reagents dispensed, and the segregation and distribution of solid supports. A variety of available robotic elements (robotic arms, movable platforms, etc.) can be used or modified for these purposes.

To illustrate, controllers typically direct dipping of bead handling elements of the handling systems into, e.g., selected reaction wells of reaction blocks, wells on microwell plates, or other reaction vessels, to dispense or extract, e.g., selected beads or other solid supports. Typically, the controller systems of the present invention are appropriately configured to receive or interface with a parallel reaction device or other system component as described herein. For example, the controller optionally includes a stage upon which the reaction devices of the invention are disposed or mounted to facilitate appropriate interfacing among, e.g., a bead/fluid handler and/or detector and a particular parallel reaction device. Typically, the stage includes an appropriate mounting/alignment structural element, such as alignment pins and/or holes, a nesting well, or the like, e.g., to facilitate proper device alignment.

B. Detectors

The systems of the present invention optionally include various signal detectors, e.g., which detect mass, concentration, fluorescence, phosphorescence, radioactivity, pH, charge, absorbance, refractive index, luminescence, temperature, magnetism, or the like. Detectors optionally monitor one or a plurality of signals from upstream and/or downstream of the performance of, e.g., a given synthesis step. For example, the detector optionally monitors a plurality of optical signals, which correspond in position to "real time" results. Example detectors or sensors include photomultiplier tubes, CCD arrays, optical sensors, temperature sensors, pressure sensors, pH sensors, conductivity sensors, scanning detectors, or the like. The detector optionally moves relative to assay components, or alternatively, assay components, such as samples of selected synthesis products move relative to the detector. Optionally, the systems of the present invention include multiple detectors. Each of these types of sensors is optionally readily incorporated into the systems described herein. In these systems, such detectors are typically placed either in or adjacent to, e.g., a particular reaction vessel, such that the detector is within sensory communication with the reaction vessel. The phrase "within sensory communication" of a particular region or element, as used herein, generally refers to the placement of the detector in a position such that the detector is capable of detecting the property of the reaction vessel or portion thereof, the contents of a portion of the vessel, or the like, for which that detector was intended. The detector optionally includes or is operably linked to a computer, e.g., which has system software for converting detector signal information into assay result information or the like.

The detector optionally exists as a separate unit, or is integrated with the handling or controller system, into a single instrument. Integration of these functions into a single unit facilitates connection of these instruments with the computer (described below), by permitting the use of few or a single communication port(s) for transmitting information between system components.

Specific detection systems that are optionally used in the present invention include, e.g., a mass spectrometer, an emission spectroscope, a fluorescence spectroscope, a phosphorescence spectroscope, a luminescence spectroscope, a spectrophotometer, a photometer, a nuclear magnetic resonance spectrometer, an electron paramagnetic resonance spectrometer, an electron spin resonance spectroscope, a turbidimeter, a nephelometer, a Raman spectroscope, a refractometer, an interferometer, an x-ray diffraction analyzer, an electron diffraction analyzer, a polarimeter, an optical rotary dispersion analyzer, a circular dichroism spectrometer, a potentiometer, a chronopotentiometer, a coulometer, an amperometer, a conductometer, a gravimeter, a thermal gravimeter, a titrimeter, a differential scanning colorimeter, a radioactive activation analyzer, a radioactive isotopic dilution analyzer, or the like.

C. Computer

As noted above, the systems of the present invention optionally include a computer (or other information appliance) operably connected to or included within various system components. The computer typically includes system software that directs the handling and detection systems to, e.g., segregate or distribute solid supports into selected reaction wells or other vessels, deliver various reagents (e.g., different components or building blocks, scaffolds, or the like) to selected reaction wells of reaction blocks, deliver gases to maintain inert environments within reaction wells via syringe needles, or the like. Additionally, the handling/controller system and/or the detection system is/are optionally coupled to an appropriately programmed processor or computer which functions to instruct the operation of these instruments in accordance with preprogrammed or user input instructions, receive data and information from these instruments, and interpret, manipulate and report this information to the user. As such, the computer is typically appropriately coupled to one or both of these instruments (e.g., including an analog to digital or digital to analog converter as needed).

Standard desktop applications such as word processing software (e.g., Microsoft Word™ or Corel WordPerfect™) and database software (e.g., spreadsheet software such as Microsoft Excel™, Corel Quattro Pro™, or database programs such as Microsoft Access™ or Paradox™) can be adapted to the present invention by inputting character strings corresponding to reagents or masses thereof. For example, the systems optionally include the foregoing software having the appropriate reagent information, e.g., used in conjunction with a user interface (e.g., a GUI in a standard operating system such as a Windows, Macintosh or LINUX system) to manipulate reagent information.

The computer can be, e.g., a PC (Intel x86 or Pentium chip-compatible DOS™, OS2™, WINDOWS™, WINDOWS NT™, WINDOWS95™, WINDOWS98™, LINUX-based machine, a MACINTOSH™, Power PC, or a UNIX-based (e.g., SUN™ work station) machine) or other common commercially available computer which is known to one of skill. Software for performing, e.g., library synthesis is optionally easily constructed by one of skill using a standard programming language such as Visual basic, Fortran, Basic, Java, or the like. Any controller or computer optionally includes a monitor which is often a cathode ray tube ("CRT") display, a flat panel display (e.g., active matrix liquid crystal display, liquid crystal display), or others. Computer circuitry is often placed in a box, which includes numerous integrated circuit chips, such as a microprocessor, memory, interface circuits, and others. The box also optionally includes a hard disk drive, a floppy disk drive, a high capacity removable drive such as a writeable CD-ROM, and other common peripheral elements. Inputting devices such as a keyboard or mouse optionally provide for input from a user.

The computer typically includes appropriate software for receiving user instructions, either in the form of user input into a set of parameter fields, e.g., in a GUI, or in the form of preprogrammed instructions, e.g., preprogrammed for a variety of different specific operations. The software then converts these instructions to appropriate language for instructing the operation of one or more controllers to carry out the desired operation, e.g., varying or selecting the rate or mode of movement of various system components, directing X-Y-Z translation of the bead/fluid or other reagent handler, or of one or more micro-well plates or other reaction vessels, or the like. The computer then receives the data from the one or more sensors/detectors included within the system, and interprets the data, either provides it in a user understood format, or uses that data to initiate further controller instructions, in accordance with the programming, e.g., such as in monitoring reaction temperatures, regulating agitation rates, or the like.

IX. Kits

The present invention also provides kits that include parallel reaction devices, or components of such devices. For example, a kit typically includes at least one reaction block, a band with attached hinge and latch components, top and bottom gaskets, and top and bottom lids, as described herein. The devices of the kits of the invention are optionally pre-assembled or unassembled. Kits are optionally packaged to further include reagents, control/calibrating materials, and solid supports for performing selected solid phase synthesis reactions in the devices of the invention. In the case of pre-packaged reagents, the kits optionally include pre-measured or pre-dosed reagents that are ready to incorporate into a synthetic protocol without measurement, e.g., pre-measured fluid aliquots, or pre-weighed or pre-measured solid reagents that can be easily reconstituted by the end-user of the kit. Generally, reagents are provided in a stabilized form, so as to prevent degradation or other loss during prolonged storage, e.g., from leakage. A number of stabilizing processes are widely used for reagents that are to be stored, such as the inclusion of chemical stabilizers (i.e., enzymatic inhibitors, microcides/bacteriostats, anticoagulants), the physical stabilization of the material, e.g., through immobilization on a solid support, entrapment in a matrix (i.e., a gel), lyophilization, or the like. In certain embodiments, kits include only selected device components, such as disposable reaction blocks and/or gaskets, or other components (e.g., lids, attachment components, reaction block containers, etc.). Kits typically include appropriate instructions for operating and maintaining devices or components thereof. Kits also typically include packaging materials or containers for holding kit components.

X. Utility

The parallel reaction devices of the present invention are designed for use in essentially any chemical synthesis procedure, including solid- or solution-phase organic synthesis. The devices of the invention provide particular utility where numerous, individual reactions are performed simultaneously and, e.g., where filtration is a necessary step during the synthesis and/or workup process. Other exemplary uses for the parallel reaction devices, or device components, of the invention include performing multiple, simultaneous chromatographic or affinity-based separations/purifications. To illustrate, each reaction well of a device optionally serves as a column for chromatographic separation of chemical mixtures on, e.g., silica gel, alumina, or many other adsorbents/resins that are commonly known in the relevant art. The elution of samples or other materials is typically gravity-based or dependent on an applied pressure. Additional details regarding synthetic pathways, separations, and other processes optionally performed in the devices of the invention are described in, e.g., Seneci, *Solid-Phase Synthesis and Combinatorial Technologies,* John Wiley & Sons, Inc. (2000), Albericio and Kates, *Solid-Phase Synthesis: A Practical Guide,* Marcel Dekker (2000), An and Cook (2000) "Methodologies for generating solution-phase combinatorial libraries," *Chem. Rev.* 100: 3311–3340, Wu (Ed), *Column Handbook for Size Exclusion Chromatography,* Harcourt Brace & Company (1998), and in the references cited therein. Other general resources include, e.g., March, *Advanced Organic Chemistry: Reactions, Mechanisms, and Structure,* $4^{th}$ Ed., John Wiley & Sons, Inc. (1992), Smith and March, *March's Advanced Organic Chemistry: Reactions, Mechanisms, and Structure,* $5^{th}$ Ed., John Wiley & Sons, Inc. (2001), Carey and Sundberg, *Advanced Organic Chemistry Part A: Structure and Mechanism,* $4^{th}$ Ed., Plenum Press (2000), and in the references provided therein.

The parallel reaction devices of the invention are also optionally used to process various biological samples. For example, large numbers of microorganisms, including anaerobic organisms, or tissue samples can be cultured in parallel in the reaction wells in these devices. Methods of culturing tissues or cells are described in various publications including, e.g., Ausubel et al., eds., *Current Protocols in Molecular Biology,* a joint ventures between Greene Publishing Associates, Inc. and John Wiley & Sons, Inc. (supplemented through 2000), Freshney, *Culture of Animal Cells, a Manual of Basic Technique,* $3^{rd}$ Ed., Wiley-Liss (1994), and Humason, *Animal Tissue Techniques,* $4^{th}$ Ed., W. H. Freeman and Company (1979), and the references cited therein. Other non-limiting illustrations include performing various cell-based assays, such as pharmaceutical candidate screening, apoptosis analyses, or many other assays known in the art. Components of cell lysates are also optionally separated using, e.g., frit materials or assorted commonly known resins disposed in the arrays of reaction wells of the devices of the invention.

XI. Example

A. Example Synthesis System

Figure 10:
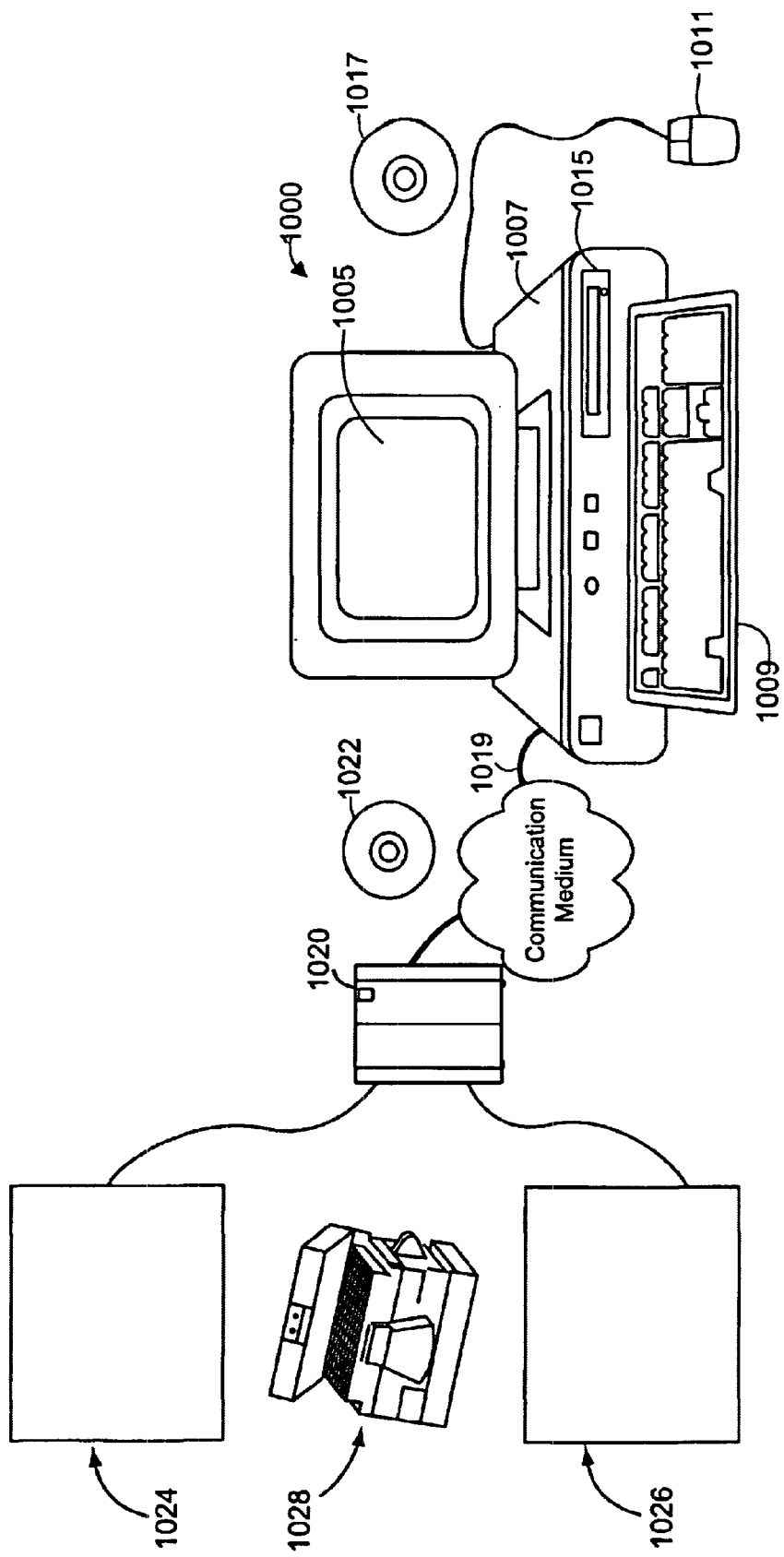
FIG. 10 is a block diagram showing a representative example synthesis system including a logic device in which various aspects of the present invention may be embodied.

FIG. 10 is a schematic showing a representative example synthesis system including a logic device in which various aspects of the present invention may be embodied. As will be understood by practitioners in the art from the teachings provided herein, the invention is optionally implemented in hardware and software. In some embodiments, different aspects of the invention are implemented in either client-side logic or server-side logic. As will be understood in the art, the invention or components thereof may be embodied in a media program component (e.g., a fixed media component) containing logic instructions and/or data that, when loaded into an appropriately configured computing device, cause that device to perform according to the invention. As will also be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 10 shows information appliance or digital device 1000 that may be understood as a logical apparatus (e.g., a computer, etc.) that can read instructions from media 1017 and/or network port 1019, which can optionally be connected to server 1020 having fixed media 1022. Apparatus 1000 can thereafter use those instructions to direct server or client logic, as understood in the art, to embody aspects of the invention. One type of logical apparatus that may embody the invention is a computer system as illustrated in 1000, containing CPU 1007, optional input devices 1009 and 1011, disk drives 1015 and optional monitor 1005. Fixed media 1017, or fixed media 1022 over port 1019, may be used to program such a system and may represent a disk-type optical or magnetic media, magnetic tape, solid state dynamic or static memory, or the like. In specific embodiments, the aspects of the invention may be embodied in whole or in part as software recorded on this fixed media. Communication port 1019 may also be used to initially receive instructions that are used to program such a system and may represent any type of communication connection. Optionally, aspects of the invention is embodied in whole or in part within the circuitry of an application specific integrated circuit (ACIS) or a programmable logic device (PLD). In such a case, aspects of the invention may be embodied in a computer understandable descriptor language, which may be used to create an ASIC, or PLD.

FIG. 10 also includes handling system 1024 and detection system 1026, both of which are operably connected to digital device 1000 via server 1020. Optionally, handling system 1024 and/or detection system 1026 are directly connected to digital device 1000. During operation, handling system 1024 typically distributes reagents and/or solid supports (e.g., individual beads, tea-bags, etc.) to selected reaction wells of parallel reaction device 1028. Between synthetic steps, handling system 1024 optionally pools and/or segregates solid supports for additional rounds of synthesis, or for product analysis, e.g., following product cleavage. Detection system 1026 optionally includes a mass spectrometer for detecting masses of selected members of a library following synthesis. Digital device 1000 digitizes, stores, and manipulates signal information detected by detection system 1026 using one or more logic instructions.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A parallel reaction device, comprising:
   (a) a reaction block comprising:
      an array of reaction wells, wherein at least one reaction well in the array is disposed through the reaction block, which reaction well comprises an inlet portion and an outlet portion; and
      at least one first top hinge component, at least one first top latch component, at least one first bottom hinge component, and at least one first bottom latch component;
   (b) a top lid comprising at least one second top hinge component and at least one second top latch component, wherein the second top hinge component engages the first top hinge component and the second top latch component removably engages the first top latch component, which top lid presses a top gasket into contact with the inlet portion to the reaction well to seal the inlet portion, when the parallel reaction device comprises the top gasket; and,
   (c) a bottom lid comprising at least one second bottom hinge component and at least one second bottom latch component, wherein the second bottom hinge component engages the first bottom hinge component and the second bottom latch component removably engages the first bottom latch component, which bottom lid presses a bottom gasket into contact with the outlet portion of the reaction well to seal the outlet portion, when the parallel reaction device comprises the bottom gasket.

2. The parallel reaction device of claim 1, wherein the reaction block is disposable.

3. The parallel reaction device of claim 1, wherein the reaction block comprises cavities disposed between and proximal to inlet portions of adjacent reaction wells to direct fluidic materials away from other inlet portions.

4. The parallel reaction device of claim 1, wherein at least a segment of the reaction well comprises an inner and an outer cross-sectional shape independently selected from the group consisting of: a regular n-sided polygon, an irregular n-sided polygon, a triangle, a square, a rounded square, a rectangle, a rounded rectangle, a trapezoid, a circle, and an oval.

5. The parallel reaction device of claim 1, wherein at least two regions of the reaction well comprise different inner or outer cross-sectional dimensions.

6. The parallel reaction device of claim 1, wherein one or more reaction wells further comprise a filter disposed therein.

7. The parallel reaction device of claim 1, wherein the outlet portions of the array of reaction wells comprise a footprint that corresponds to wells of a micro-well plate.

8. The parallel reaction device of claim 1, wherein the outlet portion comprises an outlet spout having a smaller inner cross-sectional dimension than other regions of the reaction well, and wherein a transition area between the outlet spout and the other regions in the reaction well is abrupt or tapered.

9. The parallel reaction device of claim 1, wherein the top lid produces a substantially even clamp load across all of the inlet portions.

10. The parallel reaction device of claim 1, wherein the first and second top hinge components comprises lift-off hinge components.

11. The parallel reaction device of claim 1, wherein the first and second bottom hinge components comprises lift-off hinge components.

12. The parallel reaction device of claim 1, wherein the bottom lid produces a substantially even clamp load across all of the outlet portions.

13. The parallel reaction device of claim 1, wherein the top lid further comprises at least one protrusion disposed on a surface that engages the reaction block, which protrusion presses top the gasket into contact with the inlet portion of the reaction well to seal the inlet portion, when the parallel reaction device comprises the top gasket.

14. The parallel reaction device of claim 1, wherein the bottom lid further comprises at least one protrusion disposed on a surface that engages the reaction block, which protrusion presses the bottom gasket into contact with the outlet portion of the reaction well to seal the outlet portion, when the parallel reaction device comprises the bottom gasket.

15. The parallel reaction device of claim 1, wherein the top and bottom lids are removably attached to the reaction block.

16. The parallel reaction device of claim 1, wherein the top and bottom lids open independently of one another.

17. The parallel reaction device of claim 1, wherein the top and bottom lids comprise metallic or polymeric materials.

18. The parallel reaction device of claim 1, wherein the top and bottom lids each comprise at least a first alignment structure complementary to at least a second alignment structure on a controller apparatus to align the parallel reaction device relative to the controller apparatus.

19. The parallel reaction device of claim 1, wherein the top gasket comprises at least one protrusion, which protrusion axially aligns with the inlet portion.

20. The parallel reaction device of claim 1, wherein the bottom gasket comprises at least one protrusion, which protrusion axially aligns with the outlet portion.

21. The parallel reaction device of claim 1, wherein the top and bottom gaskets comprise sheets of gasketing material.

22. The parallel reaction device of claim 1, wherein at least one of the top and bottom gaskets comprises an array of protrusions, wherein at least one protrusion axially aligns with the reaction well.

23. The parallel reaction device of claim 1, wherein the reaction block comprises one or more of: glass, metal, or a polymer.

24. The parallel reaction device of claim 23, wherein the polymer comprises polytetrafluoroethylene.

25. The parallel reaction device of claim 1, wherein the reaction block comprises 6, 12, 24, 48, 96, 384, 1536, or more reaction wells.

26. The parallel reaction device of claim 25, wherein each reaction well is disposed through the reaction block.

27. The parallel reaction device of claim 1, wherein the top lid further comprises an array of apertures disposed through the top lid, wherein at least one aperture axially aligns with the reaction well.

28. The parallel reaction device of claim 27, wherein fluidic materials are introduced into the reaction well through the aperture and the top gasket through a needle, when the parallel reaction device comprises the top gasket.

29. The parallel reaction device of claim 27, wherein the aperture is tapered.

30. The parallel reaction device of claim 27, wherein each member of the array of apertures axially aligns with a different reaction well.

31. The parallel reaction device of claim 27, further comprising a protruding annular ridge disposed around the aperture.

32. The parallel reaction device of claim 31, wherein the protruding annular ridge presses the top gasket into contact with the inlet portion of the reaction well to radially seal the inlet portion, when the parallel reaction device comprises the top gasket.

33. The parallel reaction device of claim 1, wherein the first and second top hinge components removably engage one another.

34. The parallel reaction device of claim 1, wherein the first and second bottom hinge components removably engage one another.

35. The parallel reaction device of claim 1, wherein the first top hinge component, the first top latch component, the first bottom hinge component, and the first bottom latch component are integral part of the reaction block.

36. The parallel reaction device of claim 1, wherein the reaction block further comprises at least one band disposed around the reaction block, which band comprises the first top hinge component, the first top latch component, the first bottom hinge component, and the first bottom latch component.

37. The parallel reaction device of claim 36, wherein the reaction block further comprises at least one pair of substantially opposing recessed regions disposed in opposing surfaces of the reaction block proximal to a midpoint of each surface, and wherein the band is disposed around the reaction block in the opposing recessed regions.

38. A parallel reaction device, comprising:
(a) a reaction block comprising:
an array of reaction wells, wherein at least one reaction well in the array is disposed through the reaction block, which reaction well comprises an inlet portion and an outlet portion; and
at least one first top hinge component, at least one first to latch component, at least one first bottom hinge component, and at least one first bottom latch component;
(b) a top lid comprising at least one second top hinge component and at least one second top latch component, wherein the second top hinge component engages the first top hinge component and the second top latch component removably engages the first top latch component, which top lid comprises at least one protrusion disposed on a surface that engages the reaction block, which protrusion presses a top gasket into contact with the inlet portion to the reaction well to seal the inlet portion; and,
(c) a bottom lid comprising at least one second bottom hinge component and at least one second bottom latch component, wherein the second bottom hinge component engages the first bottom hinge component and the second bottom latch component removably engages the first bottom latch component, which bottom lid presses a bottom gasket into contact with the outlet portion of the reaction well the seal the outlet portion, when the parallel reaction device comprises the bottom gasket.

* * * * *

UNITED STATES PATENT AND TRADEMARK OFFICE
CERTIFICATE OF CORRECTION

PATENT NO. : 6,682,703 B2
DATED : January 27, 2004
INVENTOR(S) : Kenneth J. Micklash, II et al.

It is certified that error appears in the above-identified patent and that said Letters Patent is hereby corrected as shown below:

Column 18,
Line 36, delete "To lid" and "to latch" and insert -- Top lid -- and -- top latch --

Column 24,
Lines 32 and 33, delete "when the parallel reaction device comprises the top gasket"
Lines 41 and 42, delete "when the parallel reaction device comprises the bottom gasket"

Column 25,
Lines 8 and 11, delete "comprises" and insert -- comprise --
Line 19, delete "top the" and insert -- the top --
Lines 20 and 21, delete "when the parallel reaction device comprises the top gasket"
Lines 26 and 27, delete "when the parallel reaction device comprises the bottom gasket"

Column 26,
Lines 4, 16 and 17, delete "when the parallel reaction device comprises the top gasket"
Line 27, delete "part" and insert -- parts --
Lines 67 and 68, delete "when the parallel reaction device comprises the bottom gasket"

Signed and Sealed this

Twenty-second Day of June, 2004

JON W. DUDAS
*Acting Director of the United States Patent and Trademark Office*